(12) United States Patent
Gibson et al.

(10) Patent No.: US 7,989,565 B2
(45) Date of Patent: Aug. 2, 2011

(54) POLYOLEFINS

(75) Inventors: Vernon Charles Gibson, London (GB); David John Jones, London (GB); Grant Berent Jacobsen, Tervuren (BE); Richard James Long, West Yorkshire (GB)

(73) Assignee: Ineos Europe Limited, Hampshire (GB)

( * ) Notice: Subject to any disclaimer, the term of this patent is extended or adjusted under 35 U.S.C. 154(b) by 688 days.

(21) Appl. No.: 11/662,710

(22) PCT Filed: Sep. 13, 2005

(86) PCT No.: PCT/GB2005/003522
§ 371 (c)(1),
(2), (4) Date: Mar. 14, 2007

(87) PCT Pub. No.: WO2006/030193
PCT Pub. Date: Mar. 23, 2006

(65) Prior Publication Data
US 2009/0124487 A1    May 14, 2009

(30) Foreign Application Priority Data
Sep. 14, 2004 (GB) .................................. 0420396.4

(51) Int. Cl.
*C08F 4/602* (2006.01)
*C08F 236/20* (2006.01)
*B01J 31/22* (2006.01)

(52) U.S. Cl. ........ 526/161; 526/169; 526/336; 502/103; 502/155; 502/167

(58) Field of Classification Search .................. 526/113, 526/114, 161, 336, 339, 169; 502/103, 155, 502/167
See application file for complete search history.

(56) References Cited

FOREIGN PATENT DOCUMENTS

| EP | 1 203 778 A1 | 5/2002 |
| WO | WO 00/69923 A1 | 11/2000 |
| WO | WO 02/066486 A1 | 8/2002 |
| WO | WO 2004/083263 A1 | 9/2004 |
| WO | WO 2005/111099 A1 | 11/2005 |

OTHER PUBLICATIONS

Tomov, A.K., et al; "Bis(benzimidazole)amine vanadium catalysts for olefin polymerisation and co-polymerisation: thermally robust, single-site catalysts activated by simple alkylaluminium reagents"; *Chem. Commun.*; (Cambridge, United Kingdom); vol. 17, pp. 1956-1957; Jul. 9, 2004; XP-002362205.

*Primary Examiner* — Caixia Lu
(74) *Attorney, Agent, or Firm* — Nixon & Vanderhye

(57) ABSTRACT

Process for making a copolymer by copolymerising (1) ethylene with (2) at least one comonomer selected from aliphatic $C_3$-$C_{20}$ alpha-olefins and (3) 5-ethylidene-2-norbornene, including contacting the monomer with a catalyst comprising a transition metal compound having the following Formula A, and an activating quantity of a suitable activator of the formula shown herein, wherein Z comprises a five-membered heterocyclic group, the five membered heterocyclic group containing at least one carbon atom, at least one nitrogen atom and at least one other hetero atom selected from nitrogen, sulphur and oxygen, the remaining atoms in the ring being selected from nitrogen and carbon; M is a metal from Group 3 to 11 of the Periodic Table or a lanthanide metal; $E^1$ and $E^2$ are divalent groups independently selected from (i) aliphatic, hydrocarbon, (ii) alicyclic hydrocarbon, (iii) aromatic hydrocarbon, (iv) alkyl substituted aromatic hydrocarbon, (v) heterocyclic groups and (vi) heterosubstituted derivatives of said groups (i) to (v); $D^1$ and $D^2$ are donor atoms or groups; X is an anionic group, L is a neutral donor group; n=m=zero or 1; y and z are independently zero or integers such that the number of X and L groups satisfy the valency and oxidation state of the metal M.

19 Claims, 1 Drawing Sheet

POLYOLEFINS

This application is the U.S. National Phase of International Application PCT/GB2005/003522, filed 13 Sep. 2005, which designated the U.S. PCT/GB2005/003522, claims priority to British Application No. 0420396.4, filed 14 Sep. 2004. The entire content of these applications are incorporated herein by reference.

The present invention relates to olefin copolymers and to methods for their manufacture.

BACKGROUND OF THE INVENTION

The use of certain transition metal compounds to polymerise 1-olefins, for example, ethylene or propylene, is well established in the prior art. The earliest catalysts for the catalysed polymerisation and copolymerisation of 1-olefins were the well-known Ziegler-Natta catalysts based on transition metal halide, e.g. titanium or vanadium chloride and an alkyl aluminium compound. More recently the use of certain metallocene catalysts (for example biscyclopentadienylzirconiumdichloride activated with alumoxane) has provided catalysts with potentially high activity. The use of metallocene based catalysts in the manufacture of EPM and EPDM elastomeric copolymers has been disclosed in, for Example, U.S. Pat. No. 6,545,088 (Dow Global Technologies Inc).

SUMMARY OF THE INVENTION

An object of the present invention is to provide an improved process for manufacturing a copolymer, preferably an elastomeric copolymer, based on copolymerised units of ethylene, propylene and a diene.

The present invention provides a process for making a copolymer comprising copolymerising (1) ethylene with (2) at least one comonomer selected from the group consisting of aliphatic $C_3$-$C_{20}$ alpha-olefins and (3) at least one diene selected from $C_4$ to $C_{30}$ conjugated and nonconjugated dienes, comprising contacting the monomer with a catalyst comprising
  (a) a transition metal compound having the following Formula A, and
  (b) an activating quantity of a suitable activator,

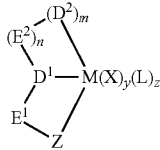

Formula A wherein Z comprises a five-membered heterocyclic group, the five membered heterocyclic group containing at least one carbon atom, at least one nitrogen atom and at least one other hetero atom selected from nitrogen, sulphur and oxygen, the remaining atoms in said ring being selected from nitrogen and carbon; M is a metal from Group 3 to 11 of the Periodic Table or a lanthanide metal; $E^1$ and $E^2$ are divalent groups independently selected from (i) aliphatic hydrocarbon, (ii) alicyclic hydrocarbon, (iii) aromatic hydrocarbon, (iv) alkyl substituted aromatic hydrocarbon (v) heterocyclic groups and (vi) heterosubstituted derivatives of said groups (i) to (v); $D^1$ and $D^2$ are donor atoms or groups; X is an anionic group, L is a neutral donor group; n=m=zero or 1; y and z are independently zero or integers such that the number of X and L groups satisfy the valency and oxidation state of the metal M.

The copolymers of the present invention frequently have elastomeric properties. The copolymers comprise 30 to 85, preferably 40 to 80 and more preferably 50 to 75, weight percent of copolymerised ethylene units; 14 to 70, preferably 19 to 60 and more preferably 24 to 55, weight percent of copolymerised units the at least one comonomer selected from the group consisting of aliphatic $C_3$-$C_{20}$ alpha-olefins; and 0.1 to 20, preferably 0.5 to 15, more preferably 1 to 12 weight percent of copolymerised units of the at least one diene selected from $C_4$ to $C_{30}$ conjugated and nonconjugated dienes. Accordingly, the quantities of monomers fed to the copolymerisation reaction are preferably such as to provide copolymers having a composition of copolymerised units falling within these defined ranges. The quantities can be determined by simple trial and error experimental testing to determine the reactivity ratios of the relevant comonomers.

Examples of the aliphatic $C_3$-$C_{20}$ alpha-olefins include propene, 1-butene, 4-methyl-1-pentene, 1-hexene, 1-octene, 1-decene, 1-dodecene, 1-tetradecene, 1-hexadecene, 1-octadecene and 1-eicosene. The alpha-olefin can also contain a cyclic structure such as cyclohexane or cyclopentane, resulting in an alpha-olefin such as 3-cyclohexyl-1-propene (allylcyclohexane) and vinyl-cyclohexane. Although not alpha-olefins in the classical sense of the term, certain cyclical olefins such as norbornene and related olefins can be used in place of some or all of the alpha-olefins.

Examples of non-conjugated dienes include aliphatic dienes such as 1,4-pentadiene, 1,4-hexadiene, 1,5-hexadiene, 2-methyl-1,5-hexadiene, 1,6-heptadiene, 6-methyl-1,5-heptadiene, 1,6-octadiene, 1,7-octadiene, 7-methyl-1,6-octadiene, 1,13-tetradecadiene, 1,1,9-eicosadiene, and the like; cyclic dienes such as 1,4-cyclohexadiene, bicyclo[2.2.1]hept-2,5diene, 5-ethylidene-2-norbornene, 5-methylene-2-norbornene, 5-vinyl-2-norbornene, bicyclo[2.2.2]oct-2,5-diene, 4-vinylcyclohex-1-ene, bicyclo[2.2.2]oct-2,6-diene, 1,7,7-trimethylbicyclo[2.2.1]hept-2,5-diene, dicyclopentadiene, methyltetrahydroindene, 5-allylbicyclo[2.2.1]hept-2-ene, 1,5-cyclooctadiene, and the like; aromatic dienes such as 1,4-diallylbenzene, 4-allyl-1H-indene; and trienes such as 2,3-diisopropenylidiene-5-norbornene, 2-ethylidene-3-isopropylidene-5-norbornene, 2-propenyl-2,5-norbornadiene, 1,3,7-octatriene, 1,4,9-decatriene, and the like; with 5-ethylidene-2-norbornene a preferred nonconjugated diene.

Examples of conjugated dienes include butadiene, isoprene, 2,3-dimethylbutadiene-1,3,1,2-dimethylbutadiene-1,3,1,4-dimethylbutadiene-1,3,1-ethylbutadiene-1,3,2-phenylbutadiene-1,3, hexadiene-1,3,4-methylpentadiene-1,3,1,3-pentadiene (CH3CH—CH—CH—CH2; commonly called piperylene), 3-methyl-1,3-pentadiene, 2,4-dimethyl-1,3-pentadiene, 3-ethyl-1,3-pentadiene, and the like; with 1,3-pentadiene a preferred conjugated diene.

Examples of copolymers that can be made by the process of the present invention are ethylene/propylene/5-ethylidene-2-norbornene; ethylene/1-octene/5-ethylidene-2-norbornene; ethylene/propylene/1,3-pentadiene; and ethylene/1-octene/1,3-pentadiene; ethylene/propylene/1,7-octadiene:ethylene/propylene/1-octene/diene or ethylene/propylene/mixed dienes, wherein the diene is preferably selected from those recited above; e.g. ethylene/propylene/5-ethylidene-2-norbornene/piperylene (i.e. trans-1,3-pentadiene). In addition, the elastomers made using the process of this invention can include minor amounts, e.g. 0.05-0.5 percent by weight, of long chain branch enhancers, such as 2,5-norbornadiene (a.k.a. bicyclo[2,2,1]hepta-2,5diene), diallylbenzene, 1,7-octadiene ($H_2C=CH(CH_2)_4CH=CH_2$), and 1,9-decadiene ($H_2C=CH(CH_2)_6CH=CH_2$).

In the catalyst employed in the process of the present invention the divalent groups $E^1$ and $E^2$ are preferably not linked other than through the donor atom or group $D^1$.

At least one of the atoms present in the ring of the five-membered heterocyclic group Z is preferably bonded directly to $E^1$ and preferably a second atom in the ring is bonded directly to M. Most preferably the atom in the five-membered ring bonded directly to $E^1$ is adjacent to a second atom in said ring, said second atom being bonded directly to M.

The five-membered heterocyclic group Z preferably contains at least 2 carbon atoms in its ring and more preferably at least 3 carbon atoms in its ring. Examples of suitable 5-membered heterocyclic groups are (but are not restricted to):

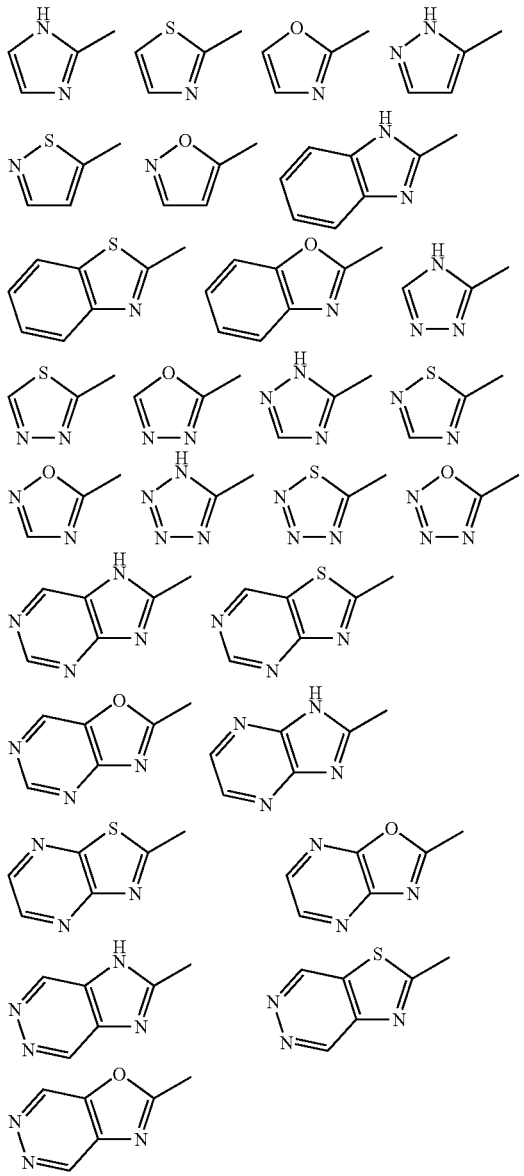

In a preferred embodiment of the present invention Z, in Formula A, is specifically an imidazole-containing group Thus the present invention further provides a process for making a copolymer comprising copolymerising (1) ethylene with (2) at least one comonomer selected from the group consisting of aliphatic $C_3$-$C_{20}$ alpha-olefins and (3) at least one diene selected from $C_4$ to $C_{30}$ conjugated and nonconjugated dienes, comprising contacting the monomer with a catalyst comprising
   (a) a transition metal compound having the following Formula A, and
   (b) an activating quantity of a suitable activator, Formula A

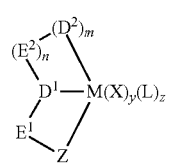

wherein Z is specifically an imidazole-containing group; M is a metal from Group 3 to 11 of the Periodic Table or a lanthanide metal; $E^1$ and $E^2$ are divalent groups independently selected from (i) aliphatic hydrocarbon, (ii) alicyclic hydrocarbon, (iii) aromatic hydrocarbon, (iv) alkyl substituted aromatic hydrocarbon (v) heterocyclic groups and (vi) heterosubstituted derivatives of said groups (i) to (v); $D^1$ and $D^2$ are donor groups; X is an anionic group, L is a neutral donor group; n=m=zero or 1; y and z are independently zero or integers such that the number of X and L groups satisfy the valency and oxidation state of the metal M.

The present invention further comprises a process for making a copolymer comprising copolymerising (1) ethylene with (2) at least one comonomer selected from the group consisting of aliphatic $C_3$-$C_{20}$ alpha-olefins and (3) at least one diene selected from $C_4$ to $C_{30}$ conjugated and nonconjugated dienes, comprising contacting the monomer with a catalyst comprising
   (1) a transition metal compound having the recited Formula A, and
   (2) an activating quantity of a suitable activator,
wherein Z comprises a five-membered heterocyclic group, the five membered heterocyclic group containing at least one carbon atom, at least one nitrogen atom and at least one other hetero atom selected from nitrogen, sulphur and oxygen, the remaining atoms in said ring being selected from nitrogen and carbon; M is a metal from Group 3 to 7 of the Periodic Table or a lanthanide metal; $E^1$ and $E^2$ are divalent groups independently selected from (i) aliphatic hydrocarbon, (ii) alicyclic hydrocarbon, (iii) aromatic hydrocarbon, (iv) alkyl substituted aromatic hydrocarbon (v) heterocyclic groups and (vi) heterosubstituted derivatives of said groups (i) to (v); $D^1$ and $D^2$ are donor atoms or groups; the divalent groups $E^1$ and $E^2$ are not linked other than through the donor atom or group $D^1$; X is an anionic group, L is a neutral donor group; n=m=zero or 1; y and z are independently zero or integers such that the number of X and L groups satisfy the valency and oxidation state of the metal M.

$D^1$ and/or $D^2$ are donor atoms or groups containing at least one donor atom. $D^1$ and/or $D^2$ can be, for example, groups having the same formula as recited for group Z. For example $D^1$ and/or $D^2$ can be groups comprising a five-membered heterocyclic group containing at least 2 carbon atoms in its ring and more preferably at least 3 carbon atoms in its ring. $D^1$ and/or $D^2$ can be imidazole-containing groups if desired. When $D^1$ and/or $D^2$ are an imidazole-containing group this or these can be identical with Z. In a preferred embodiment $D^2$ and Z are identical imidazole containing groups.

The imidazole-containing group Z is preferably a group of formula I, II or III

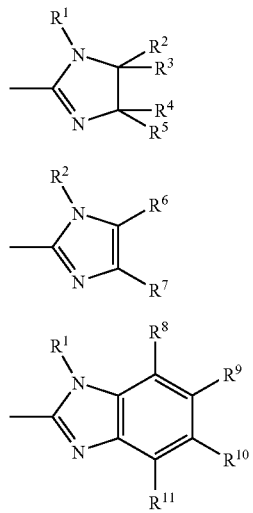

Formula I

Formula II

Formula III $R^1$ to $R^{11}$ are independently hydrogen or a monovalent (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), and (vii) hydrocarbyl-substituted heteroatom groups. The "free" valence bond on the left of Formulae I, II and III provides at least one of the links of E into the rest of Formula A. The other link or links are preferably provided by at least one of the nitrogen atoms in the imidazole-containing group. These defined groups $R^1$ to $R^{11}$ preferably contain 1 to 30, more preferably 2 to 20, most preferably 2 to 12 carbon atoms. Examples of suitable aliphatic hydrocarbon groups are methyl, ethyl, ethylenyl, butyl, hexyl, isopropyl and tert-butyl. Examples of suitable alicyclic hydrocarbon groups are adamantyl, norbornyl, cyclopentyl and cyclohexyl. Examples of suitable aromatic hydrocarbon groups are phenyl, biphenyl, naphthyl, phenanthryl and anthryl. Examples of suitable alkyl substituted aromatic hydrocarbon groups are benzyl, tolyl, mesityl, 2,6-diisopropylphenyl and 2,4,6-triisopropyl. Examples of suitable heterocyclic groups are 2-pyridinyl, 3-pyridinyl, 2-thiophenyl, 2-furanyl, 2-pyrrolyl, 2-quinolinyl. Suitable substituents for forming heterosubstituted derivatives of said groups $R^1$ to $R^{11}$ are, for example, chloro, bromo, fluoro, iodo, nitro, amino, cyano, ether, hydroxyl and silyl, methoxy, ethoxy, phenoxy (i.e. $-OC_6H_5$), tolyloxy (i.e. $-OC_6H_4(CH_3)$), xylyloxy, mesityloxy, dimethylamino, diethylamino, methylethylamino, thiomethyl, thiophenyl and trimethylsilyl. Examples of suitable heterosubstituted derivatives of said groups (i) to (v) are 2-chloroethyl, 2-bromocyclohexyl, 2-nitrophenyl, 4-ethoxyphenyl, 4-chloro-2-pyridinyl, 4-dimethylaminophenyl and 4-methylaminophenyl. Examples of suitable hydrocarbyl-substituted heteroatom groups are chloro, bromo, fluoro, iodo, nitro, amino, cyano, ether, hydroxyl and silyl, methoxy, ethoxy, phenoxy (i.e. $-OC_6H_5$), tolyloxy (i.e. $-OC_6H_4(CH_3)$), xylyloxy, mesityloxy, dimethylamino, diethylamino, methylethylamino, thiomethyl, thiophenyl and trimethylsilyl. Any of the substituents $R^1$ to $R^{11}$ may be linked to form cyclic structures. Substituents $R^2$ to $R^{11}$ may also suitably be inorganic groups such as fluoro, chloro, bromo, iodo, nitro, amino, cyano and hydroxyl.

Further suitable imidazole-containing groups may be obtained by removal of substituent $R_1$, for example by deprotonation when $R^1$ is hydrogen, to give formally monoanionic imidazole-containing groups.

It is preferred that the imidazole-containing group has a structure described in formula III (a "benzimidazole"). $R^1$ is preferably hydrogen, an aliphatic hydrocarbon group, an aromatic hydrocarbon group or is removed to give a formally monoanionic benzimidazole group. $R^8$ to $R^{11}$ are preferably hydrogen, an aliphatic hydrocarbon group or an aromatic hydrocarbon group.

$E^1$ and $E^2$ (hereinafter referred to as "E") can be the same or different. E is independently selected from divalent (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), and (vii) hydrocarbyl-substituted heteroatom groups. Examples of suitable divalent groups E are $-CH_2-$, $-CH_2CH_2-$, $-CH_2CH_2CH_2-$, 1,2-phenylene, trans-1,2-cyclopentane, trans-1,2-cyclohexane, 2,3-butane, 1,1'-biphenyl, 1,1'-binaphthyl, and $-Si(Me)_2-$. It is preferred that E is an aliphatic or aromatic hydrocarbon group. More preferably the divalent group E is $-CH_2-$.

$D^1$ and $D^2$ can be the same or different donor groups, for example oxygen, sulfur, an amine, an imine or a phosphine. Preferably $D^1$ and $D^2$ are selected from oxygen, sulfur, an amine of formula $-N(R^{12})-$ or a phosphine of formula $-P(R^{13})-$ wherein $R^{12}$ and $R^{13}$ are hydrogen or (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), (vii) hydrocarbyl-substituted heteroatom groups and (viii) further imidazole-containing groups. Alternatively $R^{12}$ or $R^{13}$ may be removed, for example by deprotonation when they are hydrogen, to give a formally monoanionic fragment; or if both $R^{12}$ or $R^{13}$ are removed they provide a formally dianionic fragment. More preferably $D^2$ is an amine of formula $-N(R^{12})-$ as defined above. $R^{12}$ is preferably hydrogen, an aliphatic hydrocarbon, an aromatic hydrocarbon or a further imidazole containing group. Preferably $D^2$ is an imidazole-containing group.

M is preferably a metal selected from Groups 3 to 11 of the periodic table, preferably from Groups 3 to 7, more preferably selected from Sc, Ti, Zr, Hf, V, Nb, Ta, Cr, Mo, W, Mn and most preferably V, Cr, Ti, Zr and Hf The anionic group X can be, for example, a halide, preferably chloride or bromide; or a hydrocarbyl group, for example, methyl, benzyl or phenyl; a carboxylate, for example, acetate or an acetylacetonate; an oxide; an amide, for example diethyl amide; an alkoxide, for example, methoxide, ethoxide or phenoxide; or a hydroxyl. Alternatively, X can be a non-coordinating or weakly-coordinating anion, for example, tetrafluoroborate, a fluorinated aryl borate or a triflate. The anionic groups X may be the same or different and may independently be monoanionic, dianionic or trianionic.

The neutral donor group L can be, for example, a solvate molecule, for example diethyl ether or THF; an amine, for example, diethyl amine, trimethylamine or pyridine; a phosphine, for example trimethyl phosphine or triphenyl phosphine; or water; or an olefin or a neutral, conjugated or non-conjugated diene, optionally substituted with one or more groups selected from hydrocarbyl or trimethylsilyl groups, said group having up to 40 carbon atoms and forming a pi-complex with M. When L is a diene ligand, it can be, for example s-trans-$\eta^4$-1,4-diphenyl-1,3-butadiene; s-trans-$\eta^4$-3-methyl-1,3-pentadiene; s-trans-$\eta^4$-1,4-dibenzyl-1,3-butadiene; s-trans-$\eta^4$-2,4-hexadiene; s-trans-$\eta^4$-1,3-pentadiene;

s-trans-$\eta^4$-1,4-ditolyl-1,3-butadiene; s-trans-$\eta^4$-1,4-bis(trimethylsilyl)-1,3-butadiene; s-trans-$\eta^4$-1,4-diphenyl-1,3-butadiene; s-cis-$\eta^4$-3-methyl-1,3-pentadiene; s-cis-$\eta^4$-1,4-dibenzyl-1,3-butadiene; s-cis-$\eta^4$-2,4-hexadiene; s-cis-$\eta^4$-1,3-pentadiene; s-cis-$\eta^4$-1,4-ditolyl-1,3-butadiene; or s-cis-$\eta^4$-1,4-bis(trimethylsilyl)-1,3-butadiene, said s-cis isomers forming a .pi.-bound diene complex;

The value of y depends on the formal charge on each group Z and D, the charge on the anionic group X and the oxidation state of the metal M. For example, if M is chromium in oxidation state +3, Z is a neutral group and both D groups are neutral, then y is 3 if X is a monoanionic group (e.g. chloride); if M is chromium in oxidation state +3, the Z group is neutral, one D group is monoanionic and the other D is neutral, then y is 2 if all X groups are monoanionic groups (e.g. chloride).

The activator (b) for the catalyst of the present invention is suitably selected from organoaluminium compounds and organoboron compounds or mixtures thereof, or may for example comprise a catalyst-activating support which is a solid particulate substance, insoluble in hydrocarbons, comprising at least magnesium and aluminium atoms and hydrocarbyloxy groups containing 1 to 20 carbons atoms. Catalysts activating supports of this type are further described later in this specification.

Examples of organoaluminium compounds include trialkyaluminium compounds, for example, trimethylaluminium, triethylaluminium, tributylaluminium, tri-n-octylaluminium, ethylaluminium dichloride, diethylaluminium chloride, tris(pentafluorophenyl)aluminium and alumoxanes. Alumoxanes are well known in the art as typically the oligomeric compounds which can be prepared by the controlled addition of water to an alkylaluminium compound, for example trimethylaluminium. Such compounds can be linear, cyclic or mixtures thereof. Commercially available alumoxanes are generally believed to be mixtures of linear, cyclic and cage compounds. The cyclic alumoxanes can be represented by the formula $[R^{16}AlO]_s$ and the linear alumoxanes by the formula $R^{17}(R^{18}AlO)_s$ wherein s is a number from about 2 to 50, and wherein $R^{16}$, $R^{17}$, and $R^{18}$ represent hydrocarbyl groups, preferably $C_1$ to $C_6$ alkyl groups, for example methyl, ethyl or butyl groups.

Examples of suitable organoboron compounds are dimethylphenylammoniumtetra(phenyl)borate, trityltetra(phenyl)borate, triphenylboron, dimethylphenylammonium tetra(pentafluorophenyl)borate, sodium tetrakis[(bis-3,5-trifluoromethyl)phenyl]borate, $H^+(OEt_2)[(bis-3,5-trifluoromethyl)phenyl]borate$, trityltetra(pentafluorophenyl)borate and tris(pentafluorophenyl)boron. Mixtures of organoaluminium compounds and organoboron compounds may be used.

In the preparation of the catalysts of the present invention the quantity of activating compound selected from organoaluminium compounds and organoboron compounds to be employed is easily determined by simple testing, for example, by the preparation of small test samples which can be used to polymerise small quantities of the monomer(s) and thus to determine the activity of the produced catalyst. It is generally found that the quantity employed is sufficient to provide 0.1 to 20,000 atoms, preferably 1 to 2000 atoms of aluminium or boron per atom of M present in the compound of Formula A. Mixtures of different activating compounds may be used.

EP1238989 discloses the use of activators (Lewis acids) selected from
  (b-1) ionic-bonding compounds having a $CdCl_2$ type or a $CdI_2$ type of layered crystal structure;
  (b-2) clays, clay minerals, or ion-exchange layered compounds;
  (b-3) heteropoly-compounds; and
  (b-4) halogenated lanthanoid compounds.

The activator employed in the present invention may be of the type disclosed in EP1238989 if desired. Such Lewis acids are those compounds which capable of receiving at least one electron pair and is capable of forming an ion pair by reaction with the transition metal complex. The Lewis acid includes the afore-mentioned (b-1) ionic-bonding compounds having a layered crystal structure of a $CdCl_2$ type or $CdI_2$ type (b-2) clay. clay minerals, or ion-exchange layered compounds, (b-3) heteropoly compounds, and (b-4) halogenated lanthanoid compounds. The Lewis acid further includes $SiO_2$, $Al_2O_3$, natural and synthetic zeolites which have Lewis acid points formed by heating or a like treatment, and complexes and mixtures thereof.

U.S. Pat. No. 6,399,535 discloses a coordinating catalyst system capable of polymerizing olefins comprising:
(I) as a pre-catalyst, at least one non-metallocene, non-constrained geometry, bidentate ligand containing transition metal compound or tridentate ligand containing transition metal compound capable of (A) being activated upon contact with the catalyst support-activator agglomerate of (II) or (B) being converted, upon contact with an organometallic compound, to an intermediate capable of being activated upon contact with the catalyst support-activator agglomerate of (II), wherein the transition metal is at least one member selected from Groups 3 to 10 of the Periodic table; in intimate contact with (II) catalyst support-activator agglomerate comprising a composite of (A) at least one inorganic oxide component selected from $SiO_2$, $Al_2O_3$, MgO, $AlPO_4$, $TiO_2$, $ZrO_2$, and $Cr_2O_3$ and (B) at least one ion containing layered material having interspaces between the layers and sufficient Lewis acidity, when present within the catalyst support-activator agglomerate, to activate the pre-catalyst when the pre-catalyst is in contact with the catalyst support-activator agglomerate, said layered material having a cationic component and an anionic component, wherein said cationic component is present within the interspaces of the layered material, said layered material being intimately associated with said inorganic oxide component within the agglomerate in an amount sufficient to improve the activity of the coordinating catalyst system for polymerizing ethylene monomer, expressed as Kg of polyethylene per gram of catalyst system per hour, relative to the activity of a corresponding catalyst system employing the same pre-catalyst but in the absence of either Component A or B of the catalyst support-activator agglomerate; wherein the amounts of the pre-catalyst and catalyst support-activator agglomerate which are in intimate contact are sufficient to provide a ratio of micromoles of pre-catalyst to grams of catalyst support-activator agglomerate of from about 5:1 to about 500:1. The layered material can be, for example, a smectite clay. The catalyst system of the present invention can be employed with a catalyst support-activator agglomerate as described in U.S. Pat. No. 6,399,535 if desired.

The activator (b) can comprise a catalyst-activating support which is a solid particulate substance, insoluble in hydrocarbons, comprising at least magnesium and aluminium atoms and hydrocarbyloxy groups containing 1 to 20 carbons atoms, the molar ratio of Mg/Al being in the range 1.0 to 300 and the molar ratio of hydrocarbyloxy groups to aluminium atoms being in the range 0.05 to 2.0, the average particle size of the support being in the range 3 to 80 micrometres (μm), Catalyst-activating hydrocarbon-insoluble supports of this type preferably contain a Mg/Al ratio in the range 40 to 150 and has a molar ratio of hydrocarbyloxy to Al in the range 0.2 to 2.0. They are preferably prepared by at least partially dissolving a magnesium halide, preferably magnesium dichloride, in an alcohol containing 1 to 20 carbons atoms and contacting the product with an organoaluminium compound having the formula $AlR_nX_{3-n}$ wherein X is halogen or hydrogen and n is 1 to 3. Supports of this type are disclosed in WO 2004/037870 and for details of their preparation this disclosure provides useful information. Examples of organoaluminium compounds that can be employed to make catalyst-activating hydrocarbon-insoluble supports are $R_3Al$, $R_2AlX$ and $RAlX_2$ wherein R is preferably $C_1$ to $C_{20}$ hydrocarbyl, and X is chlorine or bromine, preferably chlorine. R is preferably selected from methyl, ethyl, propyl, isopropyl, n-butyl, sec-butyl, tert butyl, n-pentyl, n-hexyl, n-octyl and n-decyl. Examples of alcohols that can be employed to make catalyst-activating hydrocarbon-insoluble supports are $R^1OH$ wherein $R^1$ is aliphatic, alicyclic or aralkyl, for example, methyl, ethyl, propyl, isopropyl, n-butyl, sec-butyl, tert butyl, n-pentyl, n-hexyl, n-octyl, n-decyl, cyclohexyl, ethylcyclohexyl and benzyl. In the preparation of such supports, the magnesium halide is preferably dissolved completely in the alcohol, heating or refluxing the mixture if necessary. Any undissolved magnesium halide is preferably separated before reacting the solution with the organoaluminium compound. Reacting the solution with the organoaluminium compound using quantities having the afore-recited Mg/Al ratios produces a solid having the desired chemical characteristics. The particle size of the product can be adjusted if desired by conventional methods, for examples, milling, sieving, pressing and the like. The catalyst-activating hydrocarbon-insoluble support and its preparation are suitably protected to exclude air and moisture. Preferably the preparation and storage are in an inert gas atmosphere.

In addition to the activator compound, it can be advantageous to employ catalytic quantities of certain halogenated compounds that are capable of promoting catalyst activity. Promoters of this type are especially useful in the case that the transition metal in the complex is vanadium. U.S. Pat. No. 5,191,042 discloses that certain vanadium-based catalysts activated with organoaluminium compounds can be promoted using a variety of halogenated organic compounds, for example, carbon tetrachloride, hexachloroethylene, benzylbromide, benzylchloride and 2,3- or 1,3-dichloropropylene. Other examples of halogenated organic compounds that can be used in this manner are ethyl trichloroacetate, chloroform ($CHCl_3$) and n-butylchloride. U.S. Pat. No. 5,191,042 also refers to the disclosure of Cooper (T. A Cooper, Journ. Am. Chem. Soc., 4158 (1973), which defines in Table 1 an organic halide activity index based on the ability of the halide to oxidize certain vanadium compounds under standard conditions. For example, carbon tetrachloride is assigned a reactivity of 1 in tetrahydrofuran at 20° C., and other listed halogenated organic compounds have reactivities of from about 0.02 to greater than 200 relative to carbon tetrachloride. When it is desired to use a halogenated promotor, it is preferred to use those having a Cooper Index ranging from about 0.01 up to about 30. The use of such promoters, especially in combination with vanadium-based catalysts is generally well known in the art, and for details of use of the such promoters reference may be made to U.S. Pat. No. 5,191,042 and to other prior art in this field. In the present invention it is possible to employ any halogenated organic compound as a promoter, but the compounds mentioned above are preferred.

A preferred embodiment of the present invention employs a catalyst comprising
(a) a transition metal compound having the following Formula B or C, and
(b) an activating quantity of a suitable activator,

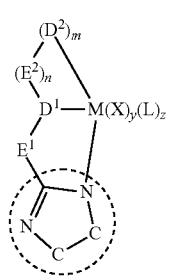

Formula B

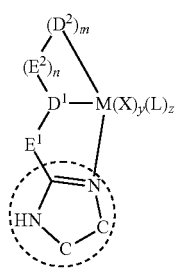

Formula C wherein the imidazole nucleus shown within the dotted circle is selected from the divalent groups represented by the Formulae Ia, IIa, IIIa, IVa, Va and VIa,

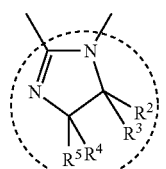

Ia

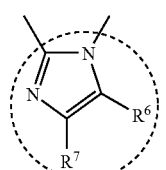

IIa

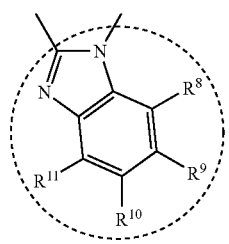

IIIa

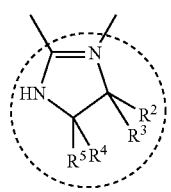

IVa

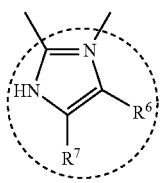

Va

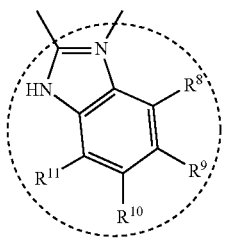

VIa wherein M is a metal from Group 3 to 11 of the Periodic Table or a lanthanide metal; $E^1$ and $E^2$ are divalent groups independently selected from (i) aliphatic hydrocarbon, (ii) alicyclic hydrocarbon, (iii) aromatic hydrocarbon, (iv) alkyl substituted aromatic hydrocarbon (v) heterocyclic groups and (vi) heterosubstituted derivatives of said groups (i) to (v); $D^1$ and $D^2$ are donor groups; X is an anionic group, L is a neutral donor group; n=m=zero or 1; y and z are independently zero or integers such that the number of X and L groups satisfy the valency and oxidation state of the metal M, wherein the groups $R^2$ to $R^{11}$ are independently hydrogen or a monovalent (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), and (vii) hydrocarbyl-substituted heteroatom groups.

M is preferably selected from Groups 3 to 7 of the periodic table.

Groups $R^2$ to $R^{11}$ are preferably selected from the groups defined above in relation to the Formula I, II, III, IV, V and VI groups.

In this preferred embodiment of the present invention, $D^1$ and $D^2$ can be the same or different donor groups, for example oxygen, sulfur, an amine, an imine or a phosphine. Preferably $D^1$ and $D^2$ are selected from oxygen, sulfur, an amine of formula —N($R^2$)— or a phosphine of formula —P($R^{13}$)— wherein $R^{12}$ and $R^{13}$ are hydrogen or (i) aliphatic hydrocarbon, (ii) alicyclic hydrocarbon, (iii) aromatic hydrocarbon, (iv) alkyl substituted aromatic hydrocarbon (v) heterocyclic groups, (vi) heterosubstituted derivatives of said groups (i) to (v), (vii) hydrocarbyl-substituted heteroatom groups and (viii) further imidazole-containing groups.

Preferably $D^1$ is nitrogen for example —$NR^1$— or =N— or a nitrogen-containing group, for example —N($R^1$)—$R^{20}$— wherein $R^1$ represents a monovalent group and $R^{20}$ represents a divalent group derived from, for example, aliphatic hydrocarbon groups such as methyl, ethyl, ethylenyl, butyl, hexyl, isopropyl and tert-butyl. Examples of suitable alicyclic hydrocarbon groups are adamantyl, norbornyl, cyclopentyl and cyclohexyl. Examples of suitable aromatic hydrocarbon groups are phenyl, biphenyl, naphthyl, phenanthryl and anthryl. Examples of suitable alkyl substituted aromatic hydrocarbon groups are benzyl, tolyl, mesityl, 2,6-diisopropylphenyl and 2,4,6-triisopropyl. Examples of suitable heterocyclic groups are 2-pyridinyl, 3-pyridinyl, 2-thiophenyl, 2-furanyl, 2-pyrrolyl, 2-quinolinyl. Suitable substituents for forming heterosubstituted derivatives of said groups $R^1$ to $R^{11}$ are, for example, chloro, bromo, fluoro, iodo, nitro, amino, cyano, ether, hydroxyl and silyl, methoxy, ethoxy, phenoxy (i.e. —$OC_6H_5$), tolyloxy (i.e. —$OC_6H_4(CH_3)$), xylyloxy, mesityloxy, dimethylamino, diethylamino, methylethylamino, thiomethyl, thiophenyl and trimethylsilyl. Examples of suitable heterosubstituted derivatives of said groups (i) to (v) are 2-chloroethyl, 2-bromocyclohexyl, 2-nitrophenyl, 4-ethoxyphenyl, 4-chloro-2-pyridinyl, 4-dimethylaminophenyl and 4-methylaminophenyl. Examples of suitable hydrocarbyl-substituted heteroatom groups are chloro, bromo, fluoro, iodo, nitro, amino, cyano, ether, hydroxyl and silyl, methoxy, ethoxy, phenoxy (i.e. —$OC_6H_5$), tolyloxy (i.e. —$OC_6H_4(CH_3)$), xylyloxy, mesityloxy, dimethylamino, diethylamino, methylethylamino, thiomethyl, thiophenyl and trimethylsilyl. Any of the substituents $R^1$ to $R^{11}$ may be linked to form cyclic structures. Substituents $R^2$ to $R^{11}$ may also suitably be inorganic groups such as fluoro, chloro, bromo, iodo, nitro, amino, cyano and hydroxyl Preferably $D^2$ is a imidazole group selected from the groups of Formula Ia, Ia and IIIa above.

As indicated above, the values of m and n in the present invention are such that m=n=zero or one. For the avoidance of doubt, this means that for a given complex, when m is zero, n is also zero. And when m is 1, n is also 1.

When m and n are zero in Formula A, the Formula reduces to Formula D, preferably to Formula E or Formula F

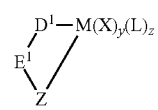

Formula D

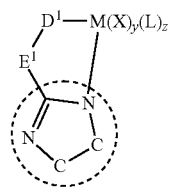

Formula E

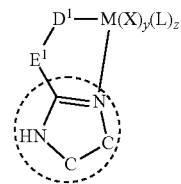

Formula F wherein D1, E1, Z, M, X, L, y and z are as defined above, and wherein the imidazole nucleus within the dotted circle is selected from the divalent groups represented by the Formulae Ia, IIa, IIIa, IVa, Va and VIa

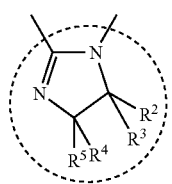

Ia

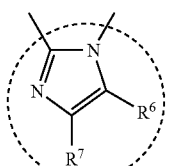
IIa
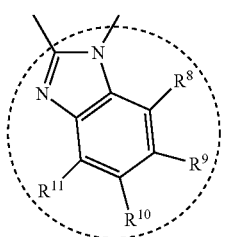
IIIa
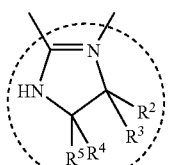
IVa
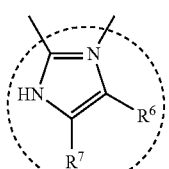
Va
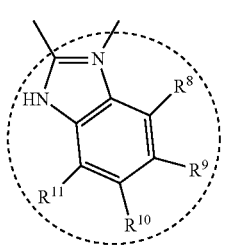
VIa
The following ligands represent some examples of those suitable for making the complexes of Formula C and D in accordance with the present invention.
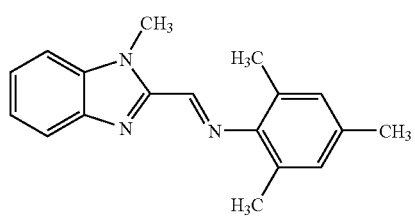
Formula 20
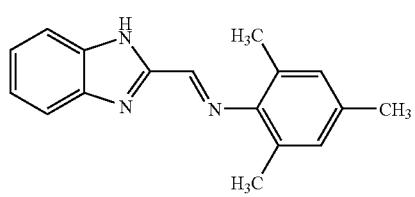
Formula 21
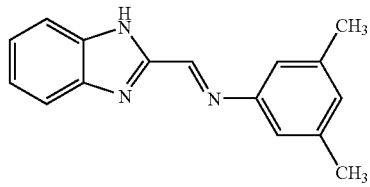
Formula 22
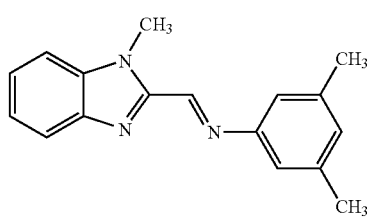
Formula 23
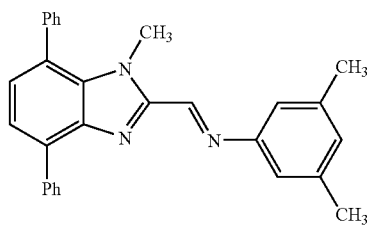
Formula 24
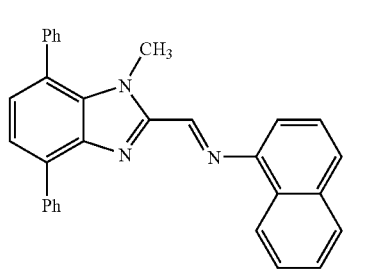
Formula 25
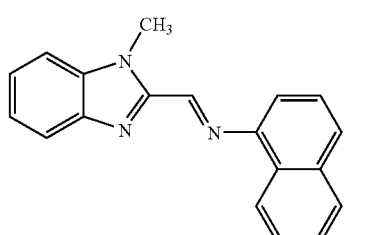
Formula 26
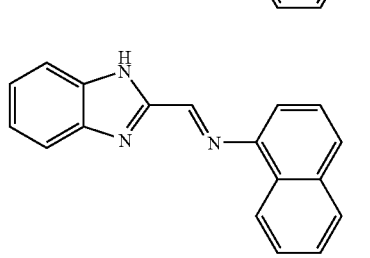
Formula 27
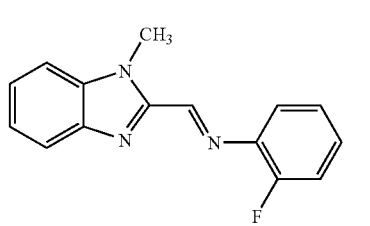
Formula 28

-continued
Formula 29
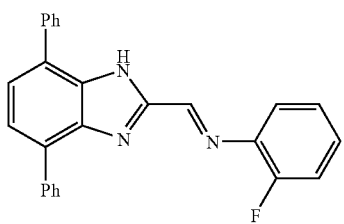
Formula 30
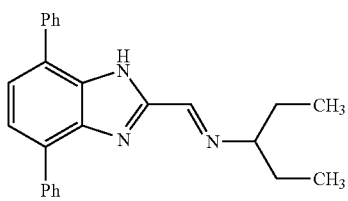
Formula 31
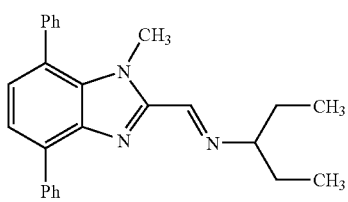
Formula 33
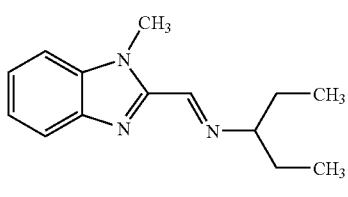
Formula 33
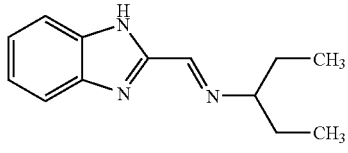
Formula 34
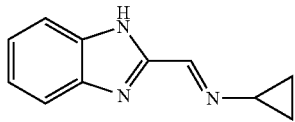
Formula 35
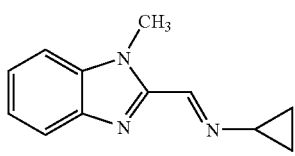
Formula 36
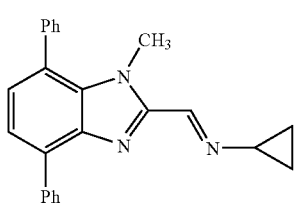
Formula 37
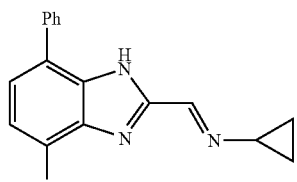
Formula 38
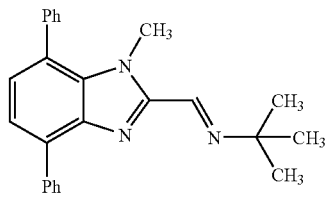
Formula 39
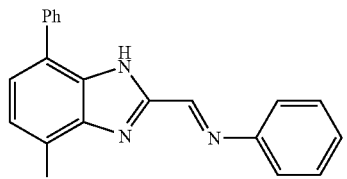
Formula 40
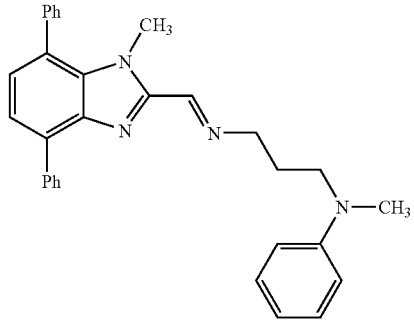
Formula 41
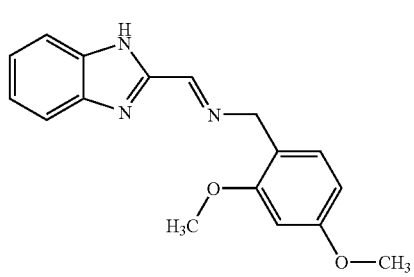
Formula 42
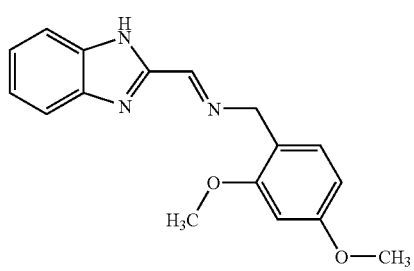

Formula 43
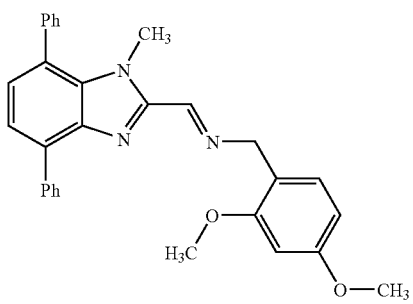
Formula 44
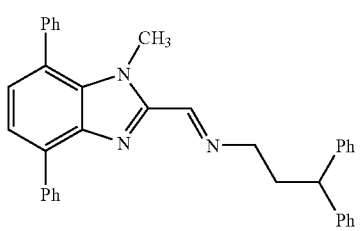
Formula 45
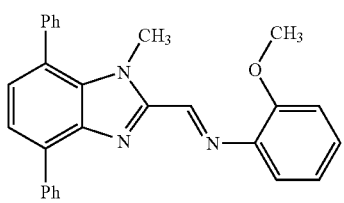
Formula 46
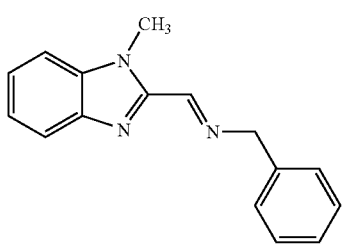
Formula 47
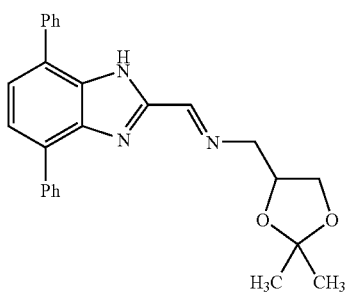
Formula 48
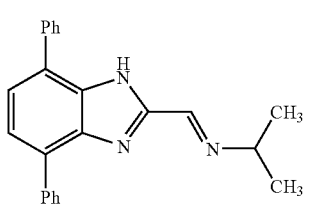
Formula 49
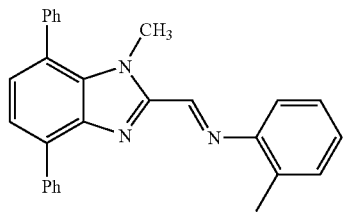
Formula 50
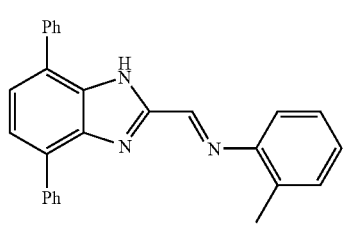
Formula 51
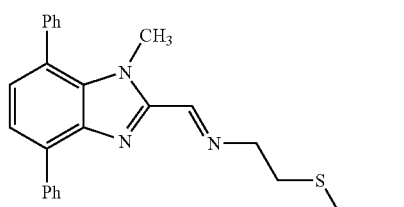
Formula 52
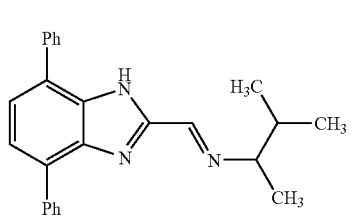
Formula 53
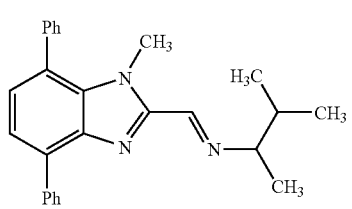
Formula 54
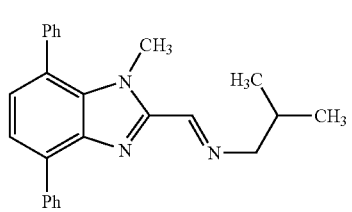
Formula 55
Formula 56
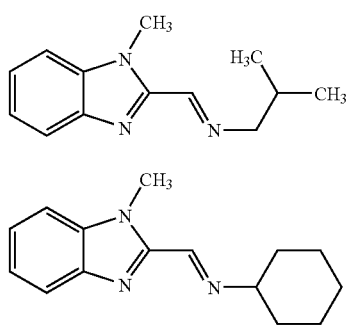

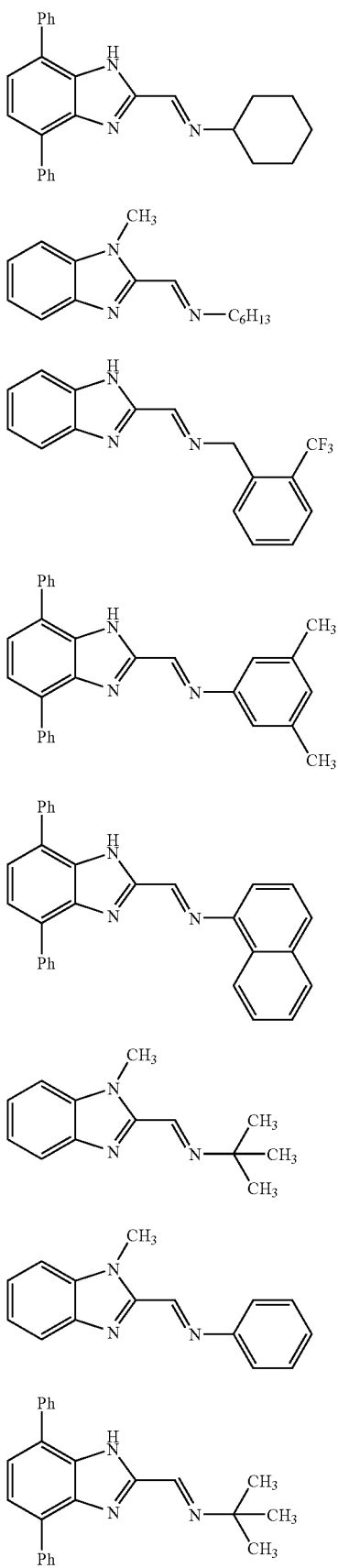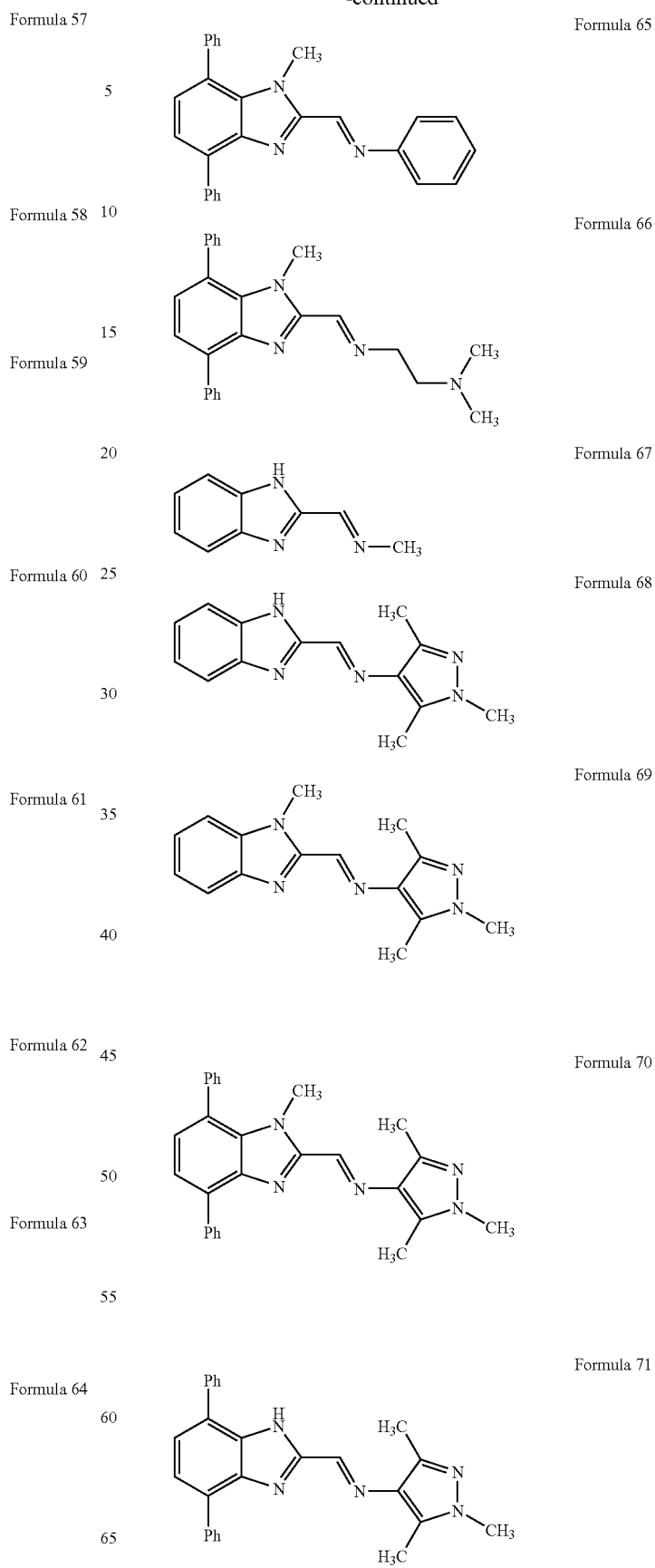

Formula 72
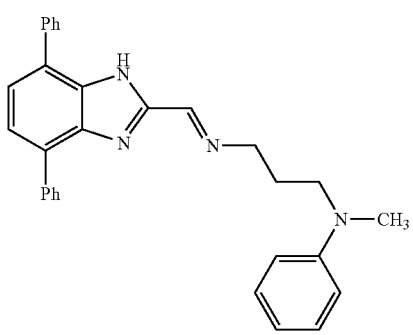
Formula 73
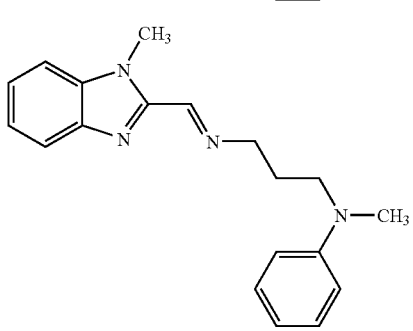
Formula 74
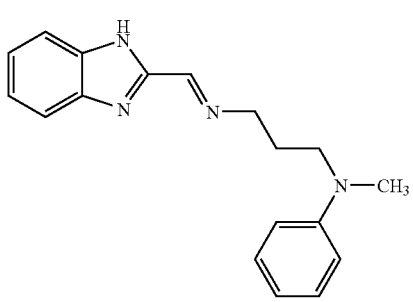
Formula 75
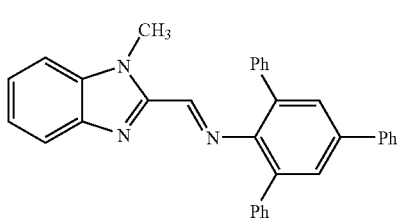
Formula 76
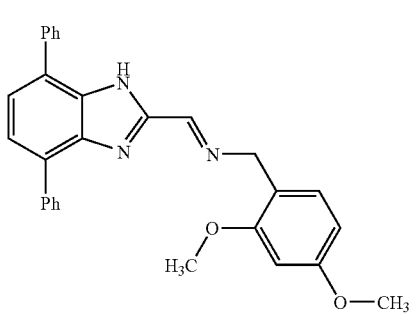
Formula 77
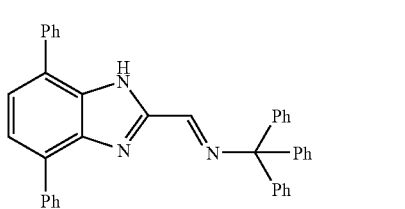
Formula 78
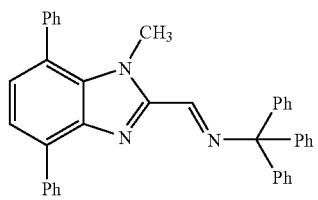
Formula 79
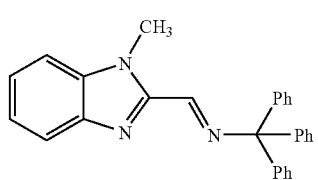
Formula 80
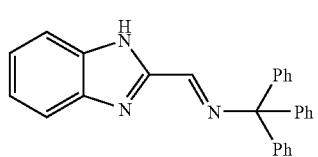
Formula 81
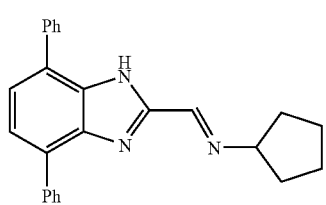
Formula 82
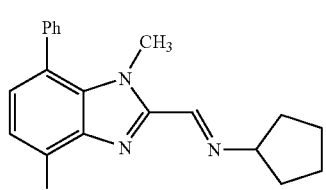
Formula 83
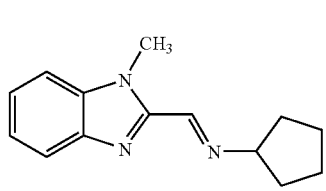
Formula 84
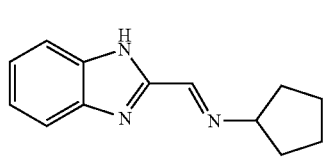
Formula 85
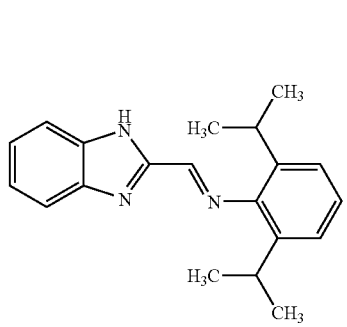

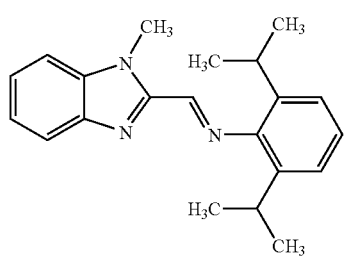
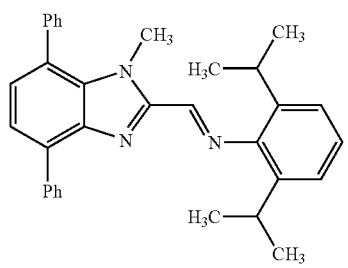
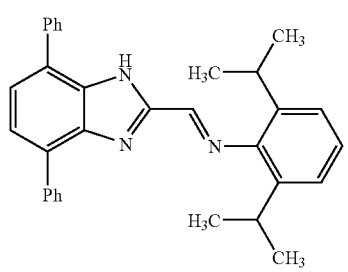
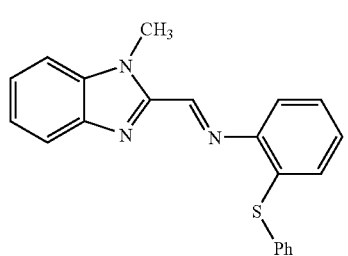
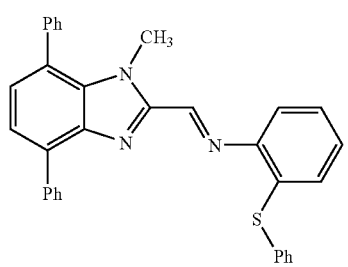
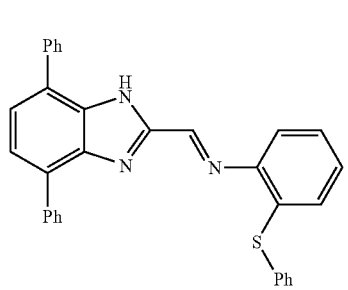
Formula 86
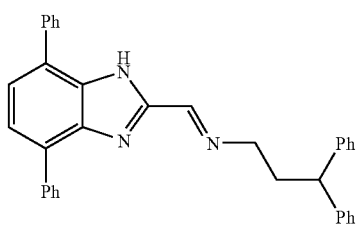
Formula 87
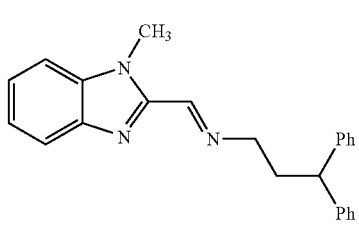
Formula 88
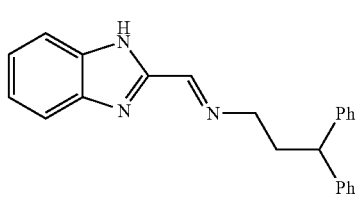
Formula 89
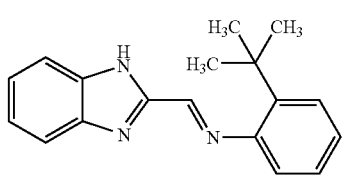
Formula 90
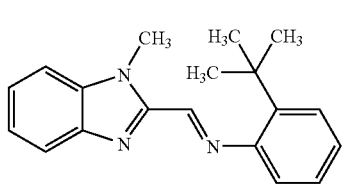
Formula 91
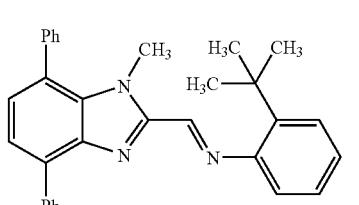
Formula 92
Formula 93
Formula 94
Formula 95
Formula 96
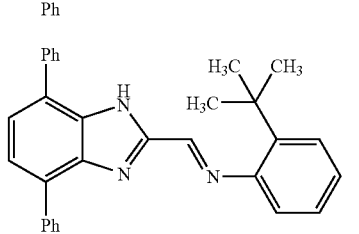
Formula 97
Formula 98
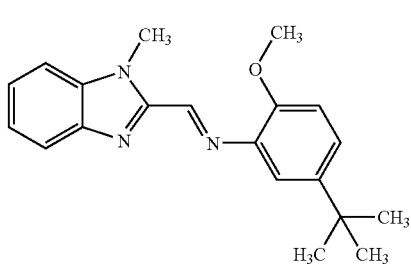
Formula 99

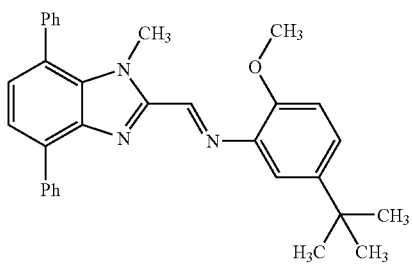
Formula 100
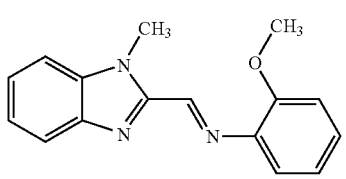
Formula 101
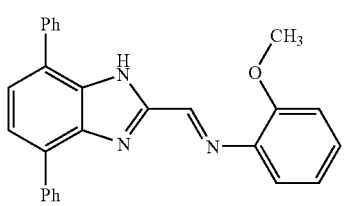
Formula 102
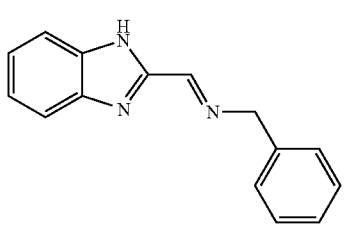
Formula 103
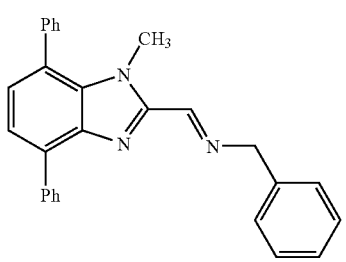
Formula 104
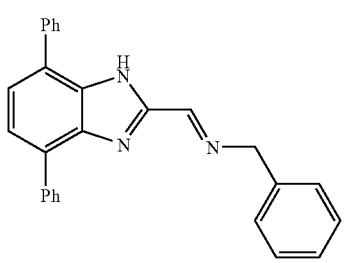
Formula 105
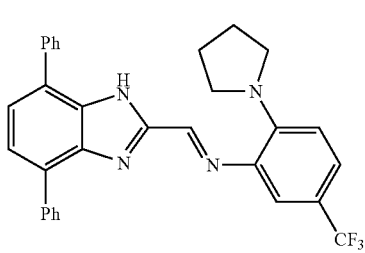
Formula 106
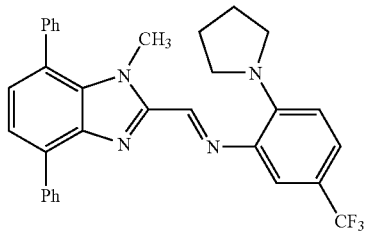
Formula 107
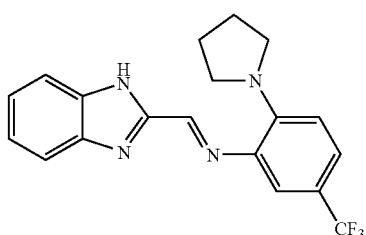
Formula 108
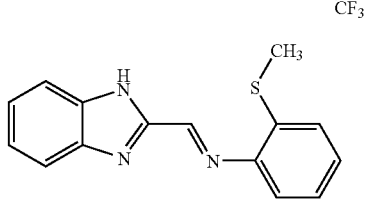
Formula 109
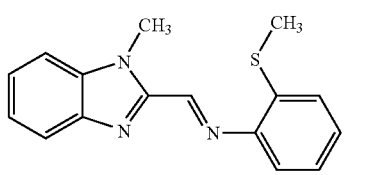
Formula 110
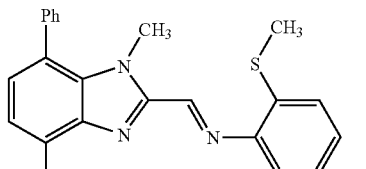
Formula 111
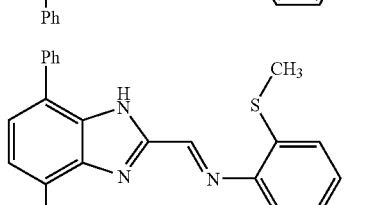
Formula 112
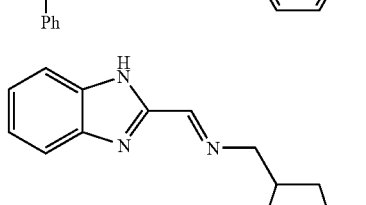
Formula 113
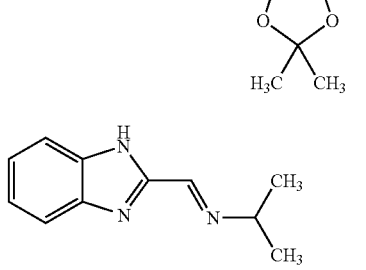
Formula 114

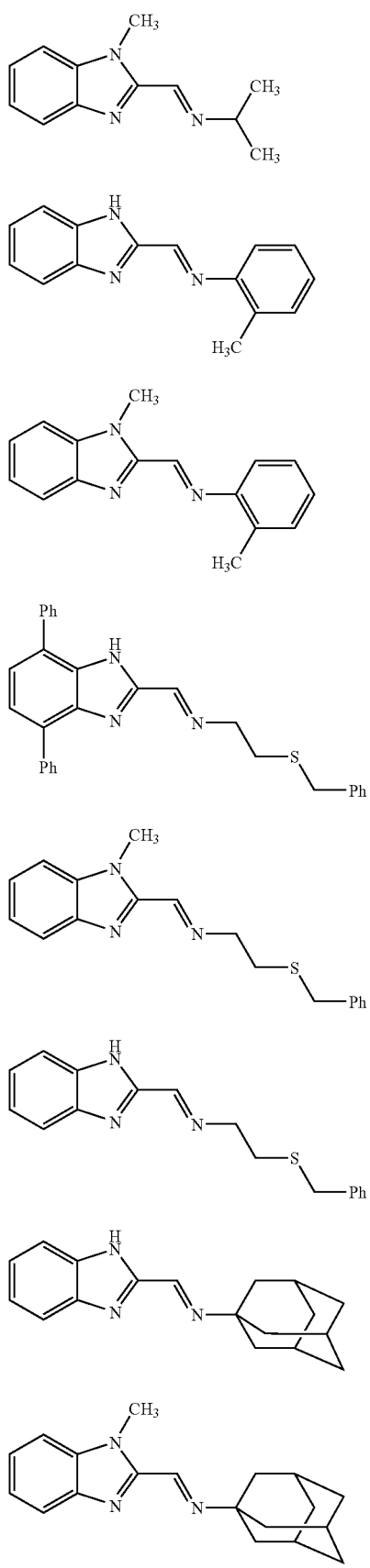
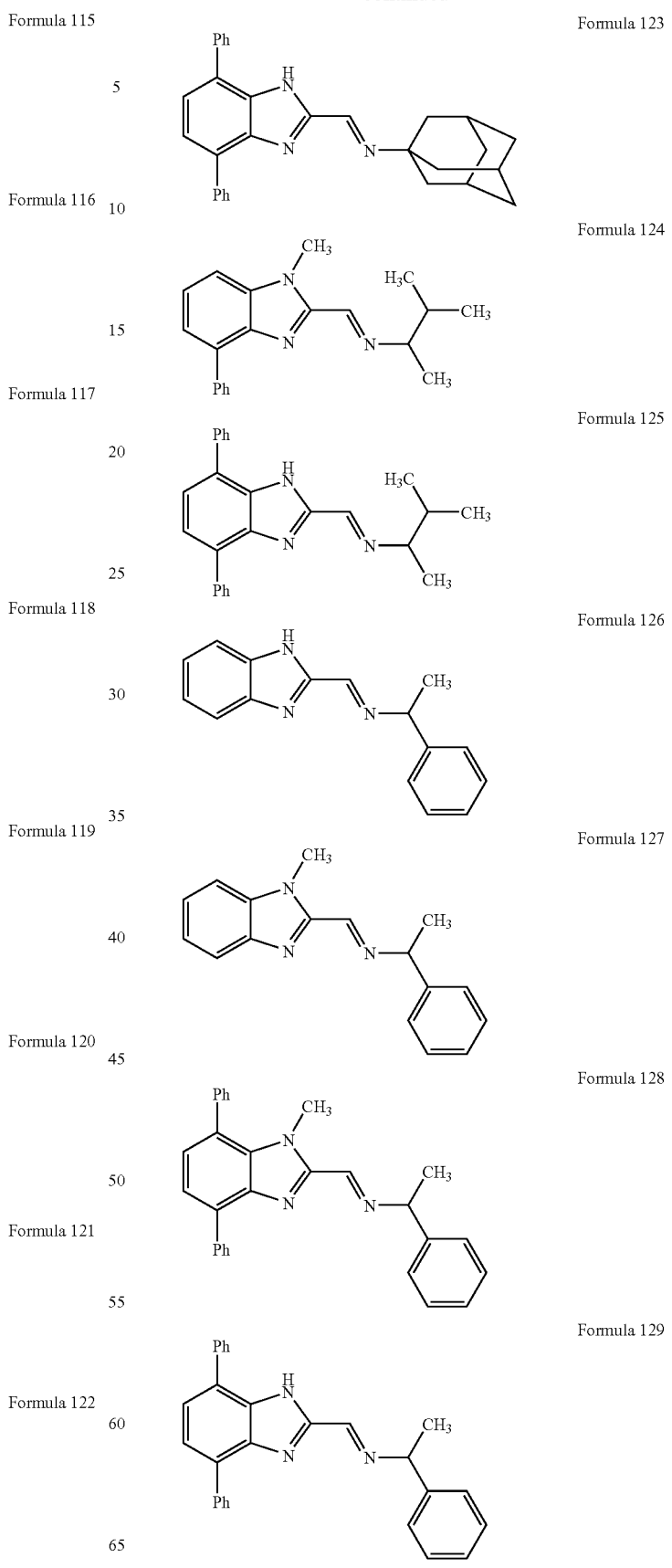

Formula 130
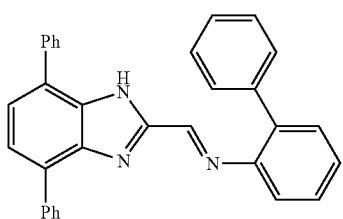
Formula 131
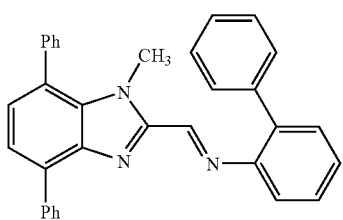
Formula 132
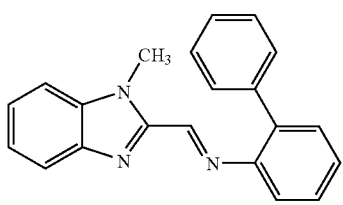
Formula 133
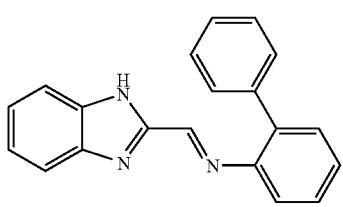
Formula 134
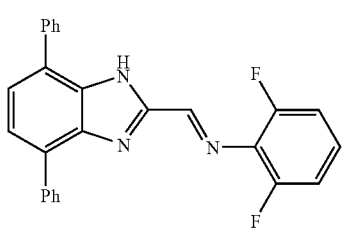
Formula 135
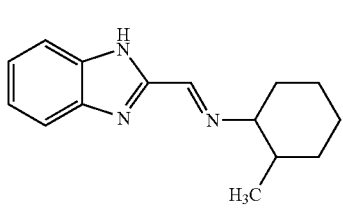
Formula 136
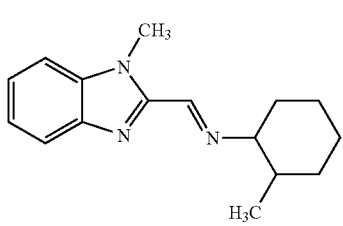
Formula 137
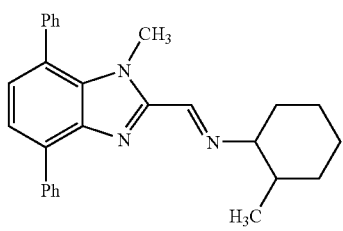
Formula 138
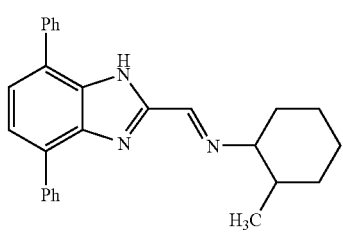
Formula 139
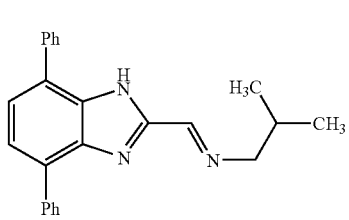
Formula 140
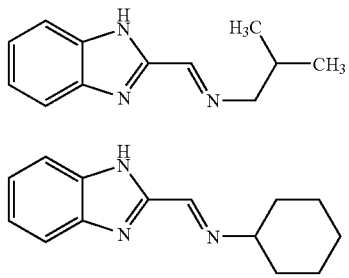
Formula 141
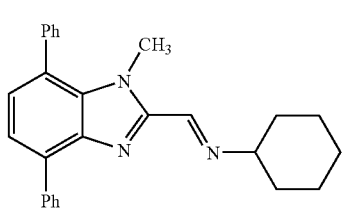
Formula 142
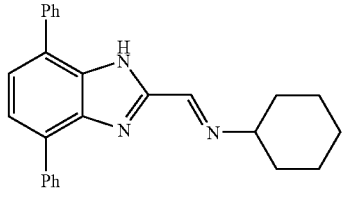
Formula 143
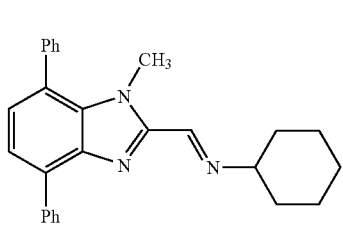
Formula 144

-continued

Formula 145
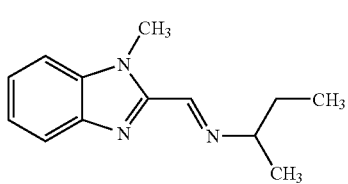

Formula 146
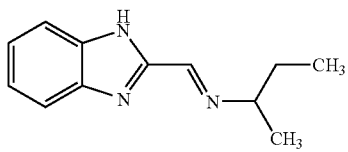

Formula 147
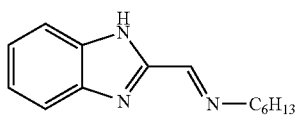

Formula 148
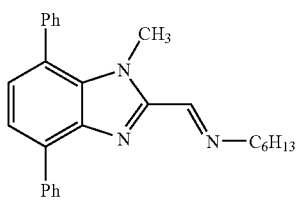

Formula 149
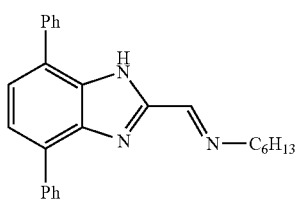

Formula 150
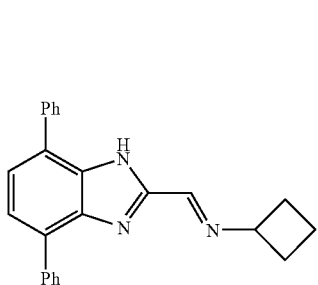

Formula 151
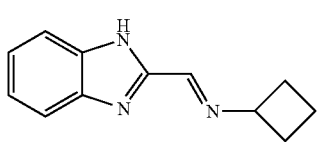

Formula 152
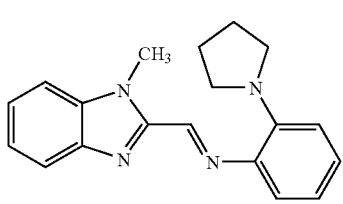

Formula 153
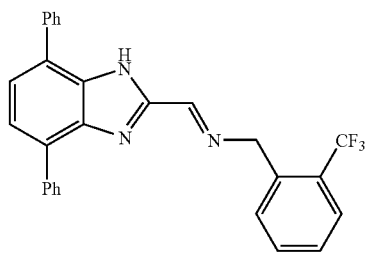

Formula 154
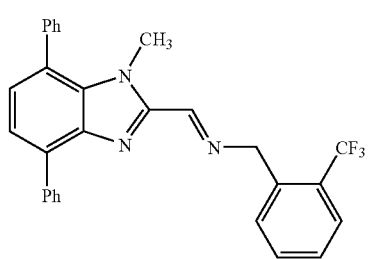

Formula 155
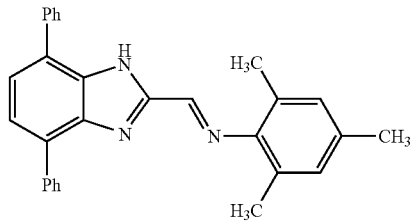

Formula 156
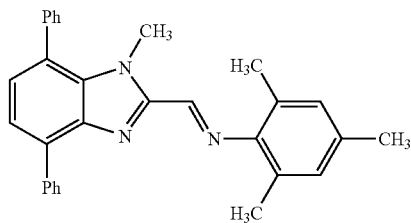

Formula 157
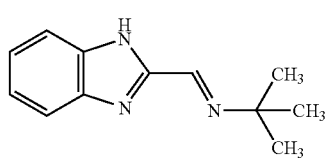

These ligands can be used to make complexes and catalysts in accordance with the present invention wherein the transition metal is preferably titanium, zirconium, hafnium, vanadium or chromium.

BRIEF DESCRIPTION OF THE DRAWINGS

The invention will now be further described with reference to the attached drawings, in which.

EXAMPLES

Figure 1:
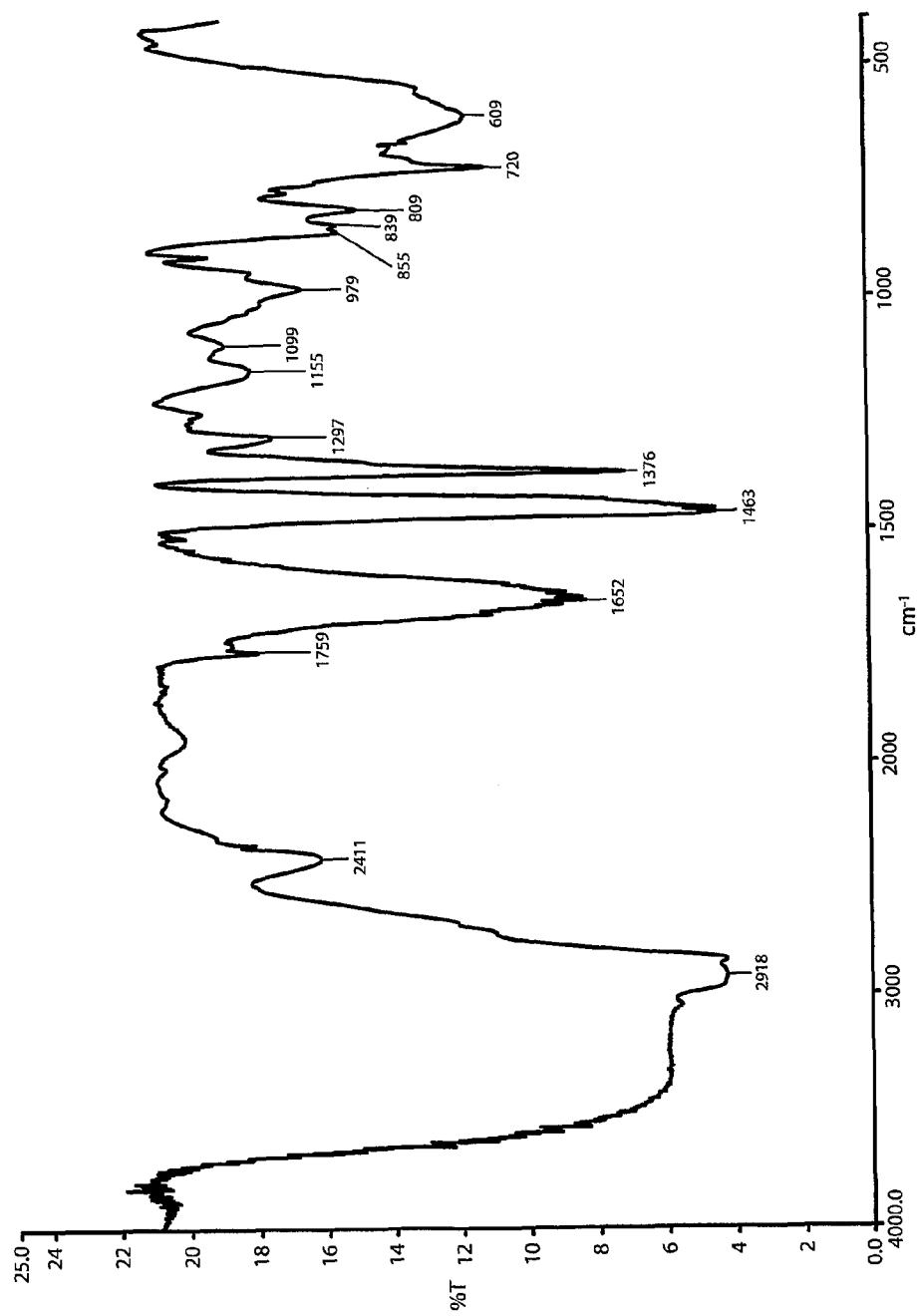
FIG. 1 illustrates the infra red spectrum of the produced ethylene/propylene/5-ethylidene-2-norbornene terpolymer.

The following are examples of transition metal complexes that can be employed in the catalyst of the present invention:

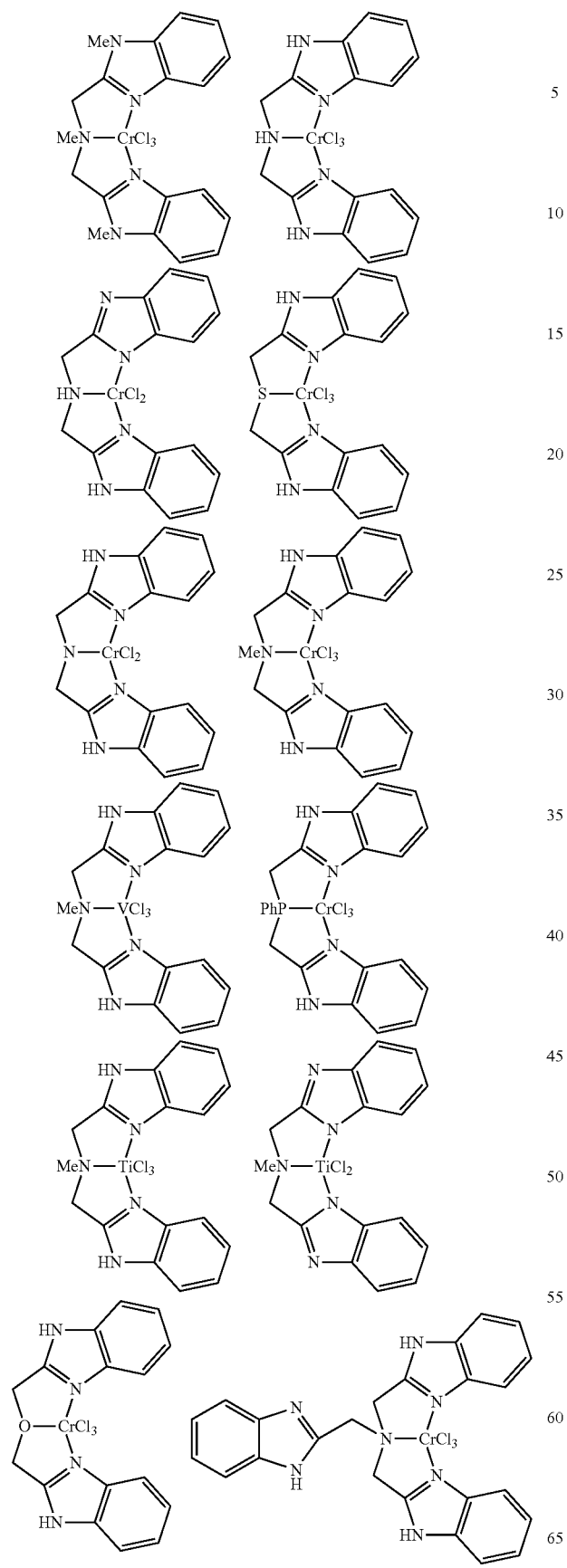
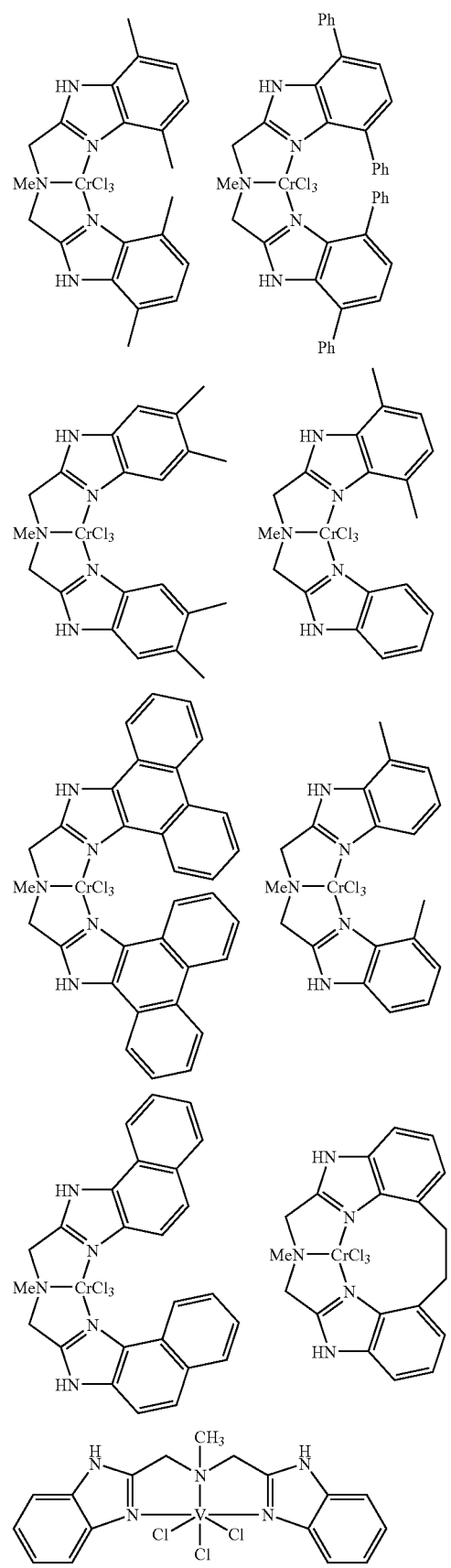

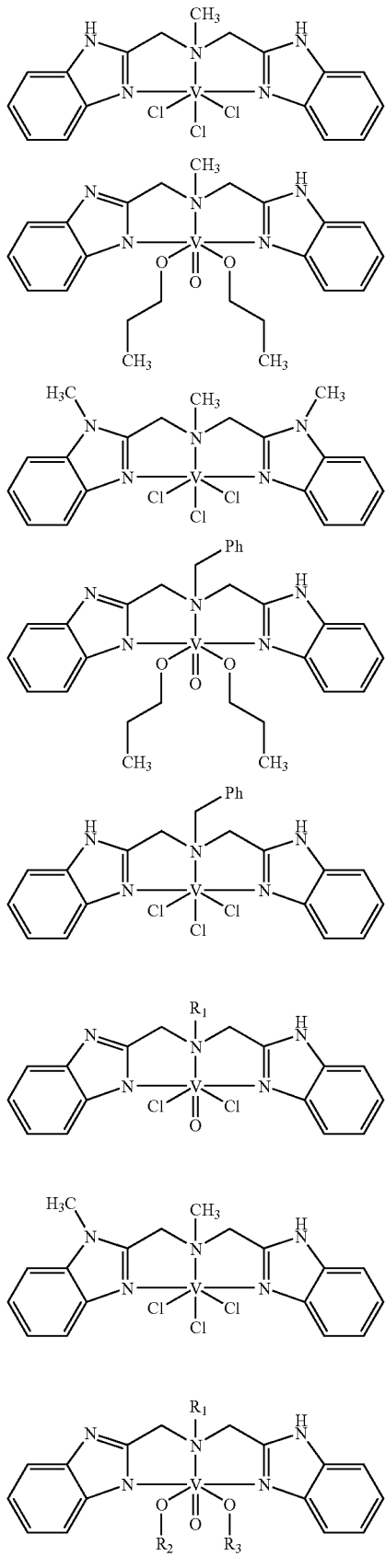
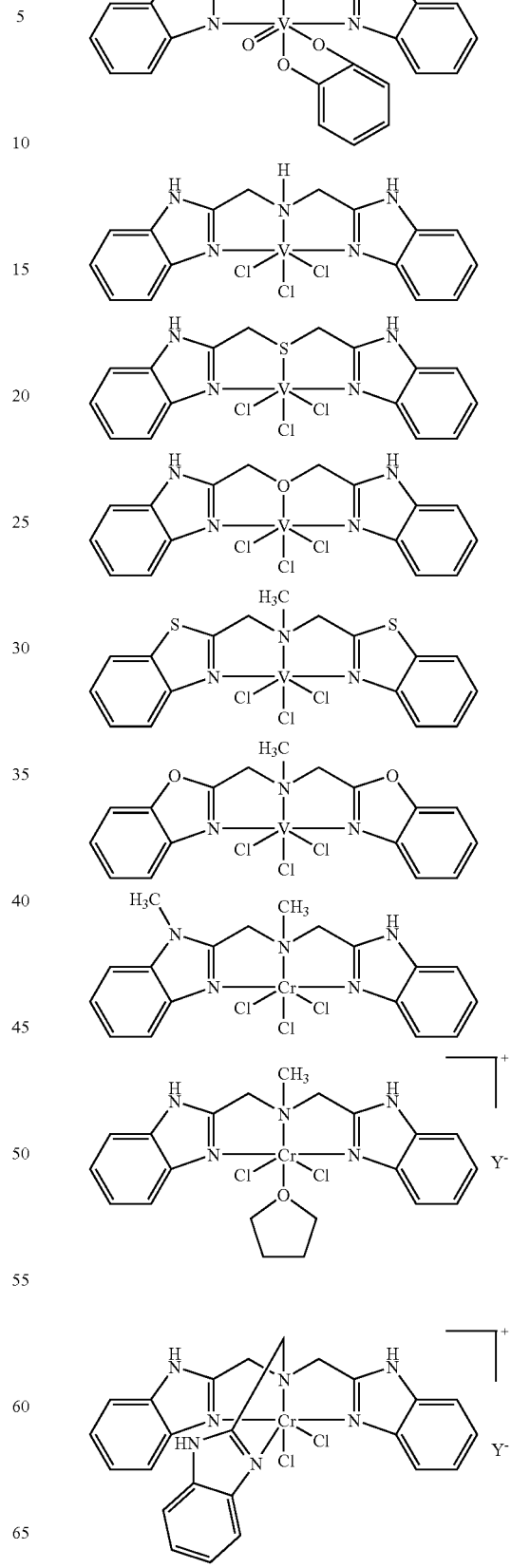
R1-R3 = alkyl, aryl, etc.

-continued

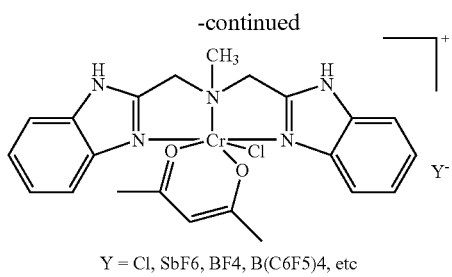

Y = Cl, SbF6, BF4, B(C6F5)4, etc

The following Formulae illustrate the transition metal compounds according to the present invention wherein L is a diene:

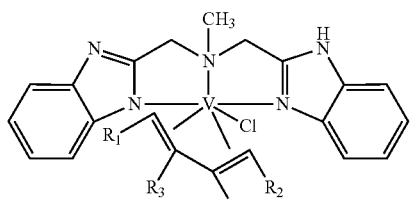

R1-R4 = alkyl, aryl, etc.

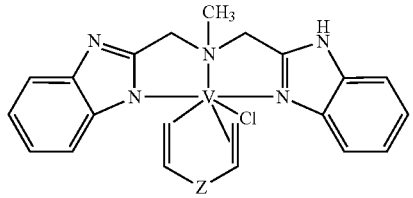

Z = divalent organic or
inorganic radical as ——CH2——,
——O——,

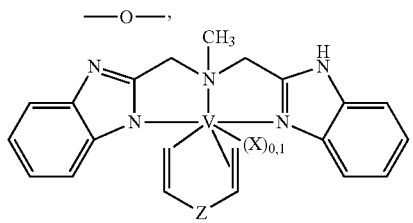

Z = divalent organic or
inorganic radical as ——CH2——,
——O——, etc.

X = Cl, Br, I, NMe2, OR, SR,
etc.

The catalyst employed in the process of the present invention can, if desired, be utilised on a support material. Suitable support materials are, for example, silica, alumina, or zirconia, magnesia, magnesium chloride or a polymer or prepolymer, for example polyethylene, polystyrene, or poly(aminostyrene).

The catalysts employed in the process of the present invention can if desired comprise more than one of the defined transition metal compounds.

In addition to said one or more defined transition metal compounds, the catalysts employed in the process of the present invention can also include one or more other catalysts for polymerising 1-olefins. Preferably such catalysts are other types of transition metal compounds or catalysts, for example, transition metal compounds of the type used in conventional Ziegler-Natta catalyst systems, metallocene-based catalysts, or heat activated supported chromium oxide catalysts (e.g. Phillips-type catalyst). The catalysts may also used in conjunction with other catalysts producing only 1-olefins, either inside or outside the polymerisation reactor, and in this way make copolymers of ethylene or propylene and these 1-olefins. Suitable catalysts for producing 1-olefins may produce only 1-butene, only 1-hexene or a distribution (for example, a Schulz-Flory distribution) of 1-olefins.

If desired the catalysts can be formed in situ in the presence of the support material, or the support material can be pre-impregnated or premixed, simultaneously or sequentially, with one or more of the catalyst components. The catalysts of the present invention can if desired be supported on a heterogeneous catalyst, for example, a magnesium halide supported Ziegler Natta catalyst, a Phillips type (chromium oxide) supported catalyst or a supported metallocene catalyst. Formation of the supported catalyst can be achieved for example by treating the transition metal compounds of the present invention with alumoxane in a suitable inert diluent, for example a volatile hydrocarbon, slurrying a particulate support material with the product and evaporating the volatile diluent. The produced supported catalyst is preferably in the form of a free-flowing powder. The quantity of support material employed can vary widely, for example from 100,000 to 1 grams per gram of metal present in the transition metal compound.

The polymerisation conditions can be, for example, bulk phase, solution phase, slurry phase or gas phase. If desired, the catalyst can be used to polymerise the monomers under high pressure/high temperature process conditions wherein the polymeric material forms as a melt in supercritical ethylene. Preferably the polymerisation is conducted under gas phase fluidised or stirred bed conditions.

A problem that can occur in the gas and slurry phase polymerisation of olefins is that of fouling of the reactor walls, any stirrer that may be present and spalling or agglomeration of the polymer due, for example, to the presence of static electricity. The problem can be reduced or eliminated by judicious use of suitable antistatic agents. One example of a family of antistatic agents suitable for use in the polymerisation of olefins are commercially available under the trade name "STADIS"

Slurry phase polymerisation conditions or gas phase polymerisation conditions are particularly useful. In these processes the polymerisation conditions can be batch, continuous or semi-continuous. In the slurry phase process and the gas phase process, the catalyst is generally fed to the polymerisation zone in the form of a particulate solid. This solid can be, for example, an undiluted solid catalyst system formed from the complex A and an activator, or can be supported. The activator can be fed to the polymerisation zone, for example as a solution, separately from or together with the solid complex. Preferably the catalyst system or the transition metal complex component of the catalyst system employed in the slurry polymerisation and gas phase polymerisation is supported on a support material. Most preferably the catalyst system is supported on a support material prior to its introduction into the polymerisation zone. Suitable support materials are, for example, silica, alumina, zirconia, talc, kieselguhr, magnesia, magnesium chloride and polymers. Or the support can be an activating support of the type hereinbefore described. Impregnation of the support material can be carried out by conventional techniques, for example, by forming a solution or suspension of the catalyst components in a suitable diluent or solvent, and slurrying the support material therewith. The support material thus impregnated with catalyst can then be separated from the diluent for example, by filtration or evaporation techniques.

In the slurry phase polymerisation process the solid particles of catalyst, or supported catalyst, are fed to a polymerisation zone either as dry powder or as a slurry in the polymerisation diluent. Preferably the particles are fed to a polymerisation zone as a suspension in the polymerisation diluent. The polymerisation zone can be, for example, an autoclave or similar reaction vessel, or a continuous loop reactor, e.g. of the type well know in the manufacture of polyethylene by the Phillips Process. When the polymerisation process of the present invention is carried out under slurry conditions the polymerisation is preferably carried out at a temperature above 0° C., most preferably above 15° C. The polymerisation temperature is preferably maintained below the temperature at which the polymer commences to soften or sinter in the presence of the polymerisation diluent. If the temperature is allowed to go above the latter temperature, fouling of the reactor can occur. Adjustment of the polymerisation within these defined temperature ranges can provide a useful means of controlling the average molecular weight of the produced polymer. A further useful means of controlling the molecular weight is to conduct the polymerisation in the presence of hydrogen gas which acts as chain transfer agent. Generally, the higher the concentration of hydrogen employed, the lower the average molecular weight of the produced polymer.

The use of hydrogen gas as a means of controlling the average molecular weight of the polymer or copolymer applies generally to the polymerisation process of the present invention. For example, hydrogen can be used to reduce the average molecular weight of polymers or copolymers prepared using gas phase, slurry phase or solution phase polymerisation conditions. The quantity of hydrogen gas to be employed to give the desired average molecular weight can be determined by simple "trial and error" polymerisation tests.

Methods for operating gas phase polymerisation processes are well known in the art. Such methods generally involve agitating (e.g. by stirring, vibrating or fluidizing) a bed of catalyst, or a bed of the target polymer (i.e. polymer having the same or similar physical properties to that which it is desired to make in the polymerisation process) containing a catalyst, and feeding thereto a stream of monomer at least partially in the gaseous phase, under conditions such that at least part of the monomer polymerises in contact with the catalyst in the bed. The bed is generally cooled by the addition of cool gas (eg recycled gaseous monomer) and/or volatile liquid (eg a volatile inert hydrocarbon, or gaseous monomer which has been condensed to form a liquid). The polymer produced in, and isolated from, gas phase processes forms directly a solid in the polymerisation zone and is free from, or substantially free from liquid. As is well known to those skilled in the art, if any liquid is allowed to enter the polymerisation zone of a gas phase polymerisation process the quantity of liquid is small in relation to the quantity of polymer present in the polymerisation zone. This is in contrast to "solution phase" processes wherein the polymer is formed dissolved in a solvent, and "slurry phase" processes wherein the polymer forms as a suspension in a liquid diluent.

The gas phase process can be operated under batch, semi-batch, or so-called "continuous" conditions. It is preferred to operate under conditions such that monomer is continuously recycled to an agitated polymerisation zone containing polymerisation catalyst, make-up monomer being provided to replace polymerised monomer, and continuously or intermittently withdrawing produced polymer from the polymerisation zone at a rate comparable to the rate of formation of the polymer, fresh catalyst being added to the polymerisation zone to replace the catalyst withdrawn form the polymerisation zone with the produced polymer.

When using the process of the present invention is under gas phase polymerisation conditions, the catalyst, or one or more of the components employed to form the catalyst can, for example, be introduced into the polymerisation reaction zone in liquid form, for example, as a solution in an inert liquid diluent. Thus, for example, the transition metal component, or the activator component, or both of these components can be dissolved or slurried in a liquid diluent and fed to the polymerisation zone. Under these circumstances it is preferred the liquid containing the component(s) is sprayed as fine droplets into the polymerisation zone. The droplet diameter is preferably within the range 1 to 1000 microns. EP-A-0593083, the teaching of which is hereby incorporated into this specification, discloses a process for introducing a polymerisation catalyst into a gas phase polymerisation. The methods disclosed in EP-A-0593083 can be suitably employed in the polymerisation process of the present invention if desired.

The process of the present invention can be employed, if desired, using processes analogous to those disclosed in WO02/46246 and U.S. Pat. No. 6,605,675. For example, a catalyst component slurry and a catalyst component solution can be combined before or during introduction into the polymerisation reactor. The properties of polymers produced using such methods can be advantageously controlled thereby. The process of the present invention can also be employed using process features disclosed in U.S. Pat. No. 6,610,799. In this process, mixtures of two or more supported catalysts can be utilised containing differing amounts of catalyst components wherein the concentrations of the individual catalyst components can be independently controlled within the polymerisation reactor.

The process of the present invention can be used in conventional commercial polymerisation facilities and its use can be sandwiched between production runs using other commercial catalyst systems of the supported or unsupported type, eg, using Ziegler Natta catalysts, metallocene catalysts, heat activated chromium oxide catalysts and late transition metal catalyst systems. Transitioning between catalyst systems of these types has been extensively described in the prior art and reference may be made to the prior art methods for analogously suitable methods readily adaptable to use of the catalyst of the present invention. For example, see EP 751965, U.S. Pat. No. 5,442,019, U.S. Pat. No. 5,672,665, U.S. Pat. No. 5,747,612, U.S. Pat. No. 5,753,786, EP 830393, U.S. Pat. No. 5,672,666, EP 1171486, EP885247, EP1182216, U.S. Pat. No. 6,284,849. US2004/0127655, WO04/060938, US2004/0138391, WO, 04/060921, WO04/060922, WO04/060929, WO04/060930, and WO04/060931.

The invention is further illustrated with reference to the following Examples. In the Examples all manipulations of air/moisture-sensitive materials were performed on a conventional vacuum/inert atmosphere (nitrogen) line using standard Schlenk line techniques, or in an inert atmosphere glove box.

Example 1.1

Preparation of [N,N-bis(1H-benzimidazol-2-ylmethyl)-N-methylamine]dipropoxyoxovanadium(V)

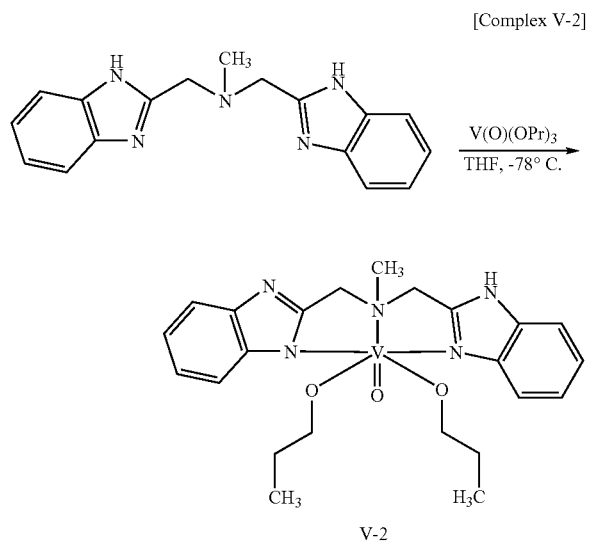

V-2

A cooled to −78° C. solution of 0.42 g (1.72 mmol) tripropoxyoxovanadium (V) in 10 ml THF was added to a cold (−78° C.) slurry of [N,N-bis(1H-benzimidazol-2-ylmethyl)-N-methylamine] in 20 ml THF. The mixture was allowed to warm up to room temperature and stirred for 30 min. The orange-red solution was filtered to remove any traces of insoluble materials (ligand) and the filtrate evaporated to c.a. 5 ml. Addition of 50 ml pentane resulted in the formation of an orange solid which was filtered, washed with 2×5 ml pentane and dried under reduced pressure. Yield—0.72 g (88.0%). Microanalysis, %: Calculated for $C_{23}H_{30}N_5O_3V$: C, 58.10; H, 6.36; N, 14.73. Found: C, 57.93; H, 6.26; N, 14.77. $^1H$ NMR (250 MHz, $D^2$-DCM), δ:0.85 (t, $J_{HH}$=14.7 Hz 6H), 1.62 (m, 4H), 2.85 (s, 3H), 3.08 (d, $J_{HH}$=15.9 Hz 2H), 4.02 (d, $J_{HH}$=16.2 Hz, 2H), 4.88 (dt, $J_{HH}$=13.4 Hz, $J_{HH}$=11.6 Hz, 2H), 5.34 (dt, $J_{HH}$=12.5 Hz, $J_{HH}$=11.3 Hz, 2H), 7.14 (m, 4H), 7.42 (m, 2H), 8.05 (m, 2H). $^{51}V$ NMR [131 MHz, V(O)Cl$_3$, $d^2$-DCM], δ, ppm: −560.2.

Example 1.2

Polymerisation of Ethylene/propylene/5-ethylidene-2-norbornene to make "EPDM"

The catalyst was prepared using 0.5 micromole V-2 in conjunction with DMAC (about 1 mmole) and ETA (about 0.04 mmol). The initial molar ratio E/P/ENB in the feed was approximately 50/40/10.

After polymerisation at 50° C. for 1 hour, a rubbery polymer (2.8 g) was produced. The activity was 5600 g polymer/mmol V.h.

DMAC is dimethylaluminium chloride.
ETA is ethyl trichloroacetate.

Example 2

Polymerisation of ethylene/propylene/5-ethylidene-2-norbornene in the presence of Catalyst V-2 (see above)

The following procedure was carried out in atmosphere of dry nitrogen using quantities of reagents as follows:
Vanadium complex (V-2)-0.2 micromoles
DMAC—1000 eq.
ETA—500 eq.
E/P/ENB ~10/30/2 mol/mol/mol A solution of 2.4 ml (17.8 mmol) 5-ethylidene-2-norbornene and 2 ml 1 M DMAC in 200 ml toluene was prepared in a Fischer-Porter bottle. The stirred reactor was heated to 50° C. and the toluene solution saturated with 2 bar propylene for 20 minutes. The activated catalyst solution (1.33 ml, 0.15 mM, Al/V=100) was then injected followed by 4.4 ml 23 mM solution of ethyl trichloroacetate in toluene. The propylene supply was turned off, the reactor connected to the ethylene line and pressurised with ethylene to 4 bar total pressure. The polymerisation reaction was carried out for 40 min. After the end of the experiment, the reactor was cooled to room temperature, depressurized via opening the vent and the reactor content poured into a beaker containing 400 ml methanol. The polymer was filtered, washed with methanol and dried in vacuo, at 60° C. for 12 h. Polymer yield—1 g. Activity—7500 g mmol$^{-1}$ h$^{-1}$.

FIG. 1 of the Drawings illustrates the infra red spectrum of the produced ethylene/propylene/5-ethylidene-2-norbornene terpolymer.

There are three important bands in the spectra—
~1650 cm-1 (ν C═C)—shows the 5-ethylidene-2-norbornene incorporated;
~1460 cm-1 (δ CH2, δ CH3)—due mainly to the deformation vibrations of the PE backbone;
~1375 cm-1 (δ CH2, δ CH3)—indicative for the presence of Me-branches The method used for determining the IR spectrum is described in J. F. O'Keefe, Rubber World, 230, (2004), 28.

The IR analysis was carried out on very thin films of polymer using a Perkin Elmer Spectrum GX FT IR system. The films were prepared by slow evaporation of solutions of the polymer in tetrachloroethylene at 60° C. under reduced pressure.

The invention claimed is:
1. A process for making a copolymer comprising copolymerising (1) ethylene with (2) at least one comonomer selected from the group consisting of aliphatic $C_3$—$C_{20}$ alpha-olefins and (3) 5-ethylidene-2-norbornene, comprising contacting the monomer with a catalyst comprising:
(a) a transition metal compound having the following Formula A, and
(b) an activating quantity of a suitable activator,

Formula A

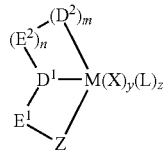

wherein Z comprises a five-membered heterocyclic group, the five membered heterocyclic group containing at least one carbon atom, at least one nitrogen atom and at least one other hetero atom selected from the group consisting of nitrogen, sulphur and oxygen, the remaining atoms in said ring being selected from the group consisting of nitrogen and carbon; M is a metal from Group 3 to 11 of the Periodic Table or a lanthanide metal; $E^1$ and $E^2$ are divalent groups independently selected from the group consisting of (i) aliphatic hydrocarbon, (ii) alicyclic hydrocarbon, (iii) aromatic hydrocarbon, (iv) alkyl substituted aromatic hydrocarbon, (v) heterocyclic groups and (vi) heterosubstituted derivatives of said groups (i) to (v); $D^1$ and $D^2$ are donor atoms or groups; X is an anionic group, L is a neutral donor group; n=m=zero or 1; y and z are independently zero or integers such that the number of X and L groups satisfy the valency and oxidation state of the metal M.

2. A process as claimed in claim 1 wherein the produced copolymer comprises 30 to 85 weight percent of copolymerised ethylene units; 14 to 70 weight percent of copolymerised units of the at least one comonomer selected from the group consisting of aliphatic $C_3$-$C_{20}$ alpha-olefins; and 0.1 to 20 weight percent of copolymerised units of 5-ethylidene-2-norbornene.

3. A process as claimed in claim 1 or 2 wherein the aliphatic $C_3$-$C_{20}$ alpha-olefin is selected from the group consisting of propene, 1-butene, 4-methyl-1-pentene, 1-hexene, 1-octene, 1-decene, 1-dodecene, 1-tetradecene, 1-hexadecene, 1-octadecene, 1-eicosene, 3-cyclohexyl-1-propene (allyl-cyclohexane) and vinyl-cyclohexane.

4. A process as claimed in claim 1 wherein the copolymer is selected from the group consisting of ethylene/propylene/ 5-ethylidene-2-norbornene and ethylene/1-octene/5-ethylidene-2-norbornene.

5. A process as claimed in claim 1 wherein the copolymer includes 0.05-0.5 percent by weight of a long chain branch enhancer selected from the group consisting of 2,5-norbornadiene, diallylbenzene, 1,7-octadiene, and 1,9-decadiene.

6. A process as claimed in claim 1 wherein the divalent groups E1 and E2 are not linked other than through the donor atom or group D1.

7. A process as claimed in claim 1 wherein the catalyst comprises:
(a) a transition metal compound of the recited Formula A, and
(b) an activating quantity of a suitable activator,
wherein Z is an imidazole-containing group; M is a metal from Group 3 to 11 of the Periodic Table or a lanthanide metal; $E^1$ and $E^2$ are divalent groups independently selected from the group consisting of (i) aliphatic hydrocarbon, (ii) alicyclic hydrocarbon, (iii) aromatic hydrocarbon, (iv) alkyl substituted aromatic hydrocarbon, (v) heterocyclic groups and (vi) heterosubstituted derivatives of said groups (i) to (v); $D^1$ and $D^2$ are donor groups; X is an anionic group, L is a neutral donor group; n=m=zero or 1; y and z are independently zero or integers such that the number of X and L groups satisfy the valency and oxidation state of the metal M.

8. A process as claimed in claim 6 wherein the catalyst comprises (a) a transition metal compound having the following Formula B or C,

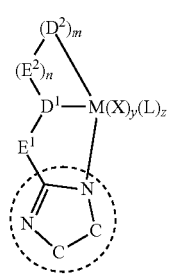

Formula B

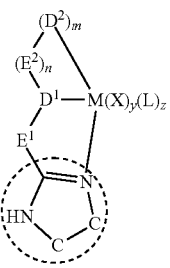

Formula C wherein the imidazole nucleus shown within the dotted circle is selected from the group consisting of divalent groups represented by the Formulae Ia, IIa, IIIa, IVa, Va and VIa,

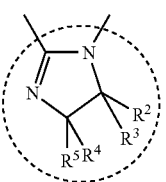

Ia

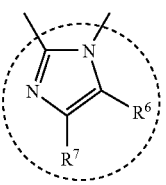

IIa

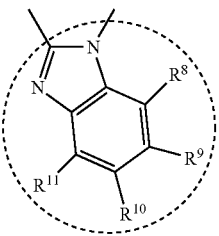

IIIa

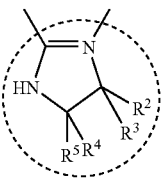

IVa

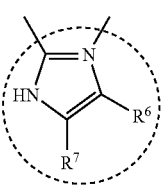

Va

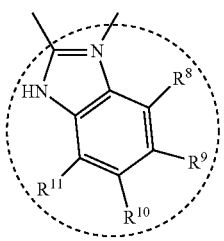
VIa wherein M is a metal from Group 3 to 11 of the Periodic Table or a lanthanide metal; $E^1$ and $E^2$ are divalent groups independently selected from the group consisting of (i) aliphatic hydrocarbon, (ii) alicyclic hydrocarbon, (iii) aromatic hydrocarbon, (iv) alkyl substituted aromatic hydrocarbon, (v) heterocyclic groups and (vi) heterosubstituted derivatives of said groups (i) to (v); $D^1$ and $D^2$ are donor groups; X is an anionic group, L is a neutral donor group; n=m=zero or 1; y and z are independently zero or integers such that the number of X and L groups satisfy the valency and oxidation state of the metal M, wherein the groups $R^2$ to $R^{11}$ are independently hydrogen or a monovalent (i) aliphatic hydrocarbon, (ii) alicyclic hydrocarbon, (iii) aromatic hydrocarbon, (iv) alkyl substituted aromatic hydrocarbon, (v) heterocyclic groups, (vi) heterosubstituted derivatives of said groups (i) to (v), and (vii) hydrocarbyl-substituted heteroatom groups.

9. A process as claimed in claim 1 wherein Z comprises a five-membered heterocyclic group, the five membered heterocyclic group containing at least one carbon atom, at least one nitrogen atom and at least one other hetero atom selected from the group consisting of nitrogen, sulphur and oxygen, the remaining atoms in said ring being selected from the group consisting of nitrogen and carbon; M is a metal from Group 3 to 7 of the Periodic Table or a lanthanide metal; $E^1$ and $E^2$ are divalent groups independently selected from the group consisting of (i) aliphatic hydrocarbon, (ii) alicyclic hydrocarbon, (iii) aromatic hydrocarbon, (iv) alkyl substituted aromatic hydrocarbon, (v) heterocyclic groups and (vi) heterosubstituted derivatives of said groups (i) to (v); $D^1$ and $D^2$ are donor atoms or groups; the divalent groups $E^1$ and $E^2$ are not linked other than through the donor atom or group $D^1$; X is an anionic group, L is a neutral donor group; n=m=zero or 1; y and z are independently zero or integers such that the number of X and L groups satisfy the valency and oxidation state of the metal M.

10. A process as claimed in claim 1 wherein the group Z is an imidazole-containing group.

11. A process as claimed in claim 1 wherein the activator (b) is selected from the group consisting of organoaluminium compounds, organoboron compounds and mixtures thereof.

12. A process as claimed in claim 1 wherein the activator is a catalyst-activating support which is a solid particulate substance, insoluble in hydrocarbons, comprising at least magnesium and aluminium atoms and hydrocarbyloxy groups containing 1 to 20 carbons atoms.

13. A process as claimed in claim 11 wherein the activator is selected from the group consisting of trimethylaluminium, triethylaluminium, tributylaluminium, tri-n-octylaluminium, ethylaluminium dichloride, diethylaluminium chloride, tris (pentafluorophenyl)aluminium, alumoxanes, dimethylphenylammoniumtetra(phenyl)borate, trityltetra(phenyl)borate, triphenylboron, dimethylphenylammonium tetra(pentafluorophenyl)borate, sodium tetrakis[(bis-3,5-trifluoromethyl)phenyl]borate, $H^+(OEt_2)$[(bis-3,5-trifluoromethyl)phenyl]borate, trityltetra(pentafluorophenyl)borate and tris(pentafluorophenyl) boron.

14. A process as claimed in claim 1 wherein the catalyst is vanadium-based and activated with an organoaluminium compound and wherein a halogenated organic compound catalyst promoter is used.

15. A process as claimed in claim 1 wherein in addition to the one or more defined transition metal catalysts the catalyst comprises an additional catalyst suitable for polymerising 1-olefins.

16. A process as claimed claim 15 wherein the additional catalyst is selected from the group consisting of conventional Ziegler-Natta catalyst systems, metallocene-based catalysts, and heat activated supported chromium oxide catalysts.

17. A process as claimed in claim 1 wherein the polymerisation conditions are bulk phase, solution phase, slurry phase or gas phase.

18. A process as claimed in claim 1 wherein the catalyst is supported on a support material prior to its introduction into the polymerisation zone.

19. A process as claimed in claim 18 wherein the support material is selected from the group consisting of silica, alumina, zirconia, talc, kieselguhr, magnesia, magnesium chloride and polymers.

\* \* \* \* \*